US011860921B2

(12) United States Patent
Emigh et al.

(10) Patent No.: US 11,860,921 B2
(45) Date of Patent: Jan. 2, 2024

(54) CATEGORY-BASED SEARCH

(71) Applicant: Huawei Technologies Co., Ltd., Shenzhen (CN)

(72) Inventors: Aaron T. Emigh, Incline Village, NV (US); James A. Roskind, Redwood City, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 17/500,657

(22) Filed: Oct. 13, 2021

(65) Prior Publication Data

US 2022/0067072 A1 Mar. 3, 2022

Related U.S. Application Data

(63) Continuation of application No. 14/495,890, filed on Sep. 25, 2014, now Pat. No. 11,163,802, which is a continuation of application No. 13/270,221, filed on Oct. 10, 2011, now Pat. No. 8,862,580, which is a continuation of application No. 12/896,910, filed on
(Continued)

(51) Int. Cl.
*G06F 16/35* (2019.01)
*G06F 16/958* (2019.01)
*G06F 16/245* (2019.01)
*G06F 16/28* (2019.01)

(52) U.S. Cl.
CPC .......... *G06F 16/353* (2019.01); *G06F 16/245* (2019.01); *G06F 16/285* (2019.01); *G06F 16/986* (2019.01)

(58) Field of Classification Search
CPC .... G06F 16/353; G06F 16/245; G06F 16/285; G06F 16/986
See application file for complete search history.

(56) References Cited

U.S. PATENT DOCUMENTS 5,537,586 A 7/1996 Amram et al.
5,544,360 A 8/1996 Lewak et al.
(Continued)

OTHER PUBLICATIONS

Thorsten Joachims, "Text Categorization with Support Vector Machines: Learning with Many Relevant Features." Apr. 19, 1998, University of Dortmund LS-8 Report 23; London: Springer-Verlag, "Lecture Notes In Computer Science; vol. 1398: Proceedings of the 10thEuropean Conference on Machine Learning," pp. 137-142.
(Continued)

*Primary Examiner* — Jay A Morrison
(74) *Attorney, Agent, or Firm* — Leydig, Voit & Mayer, Ltd.

(57) ABSTRACT

In some embodiments, techniques for searching comprise providing receiving a request for a local search, determining a current location associated with a document currently being viewed, determining a search restriction specification associated with the current location associated with the document currently being viewed, wherein the search restriction specification relates to a specification of a set of pages to be searched, obtaining local search results by performing a search, wherein the local search results are limited to members of the set of pages to be searched in accordance with the search restriction specification, and presenting the local search results.

14 Claims, 17 Drawing Sheets

Related U.S. Application Data

Oct. 3, 2010, now Pat. No. 8,069,162, which is a continuation of application No. 11/069,288, filed on Feb. 28, 2005, now Pat. No. 7,831,581.

(60) Provisional application No. 60/549,524, filed on Mar. 1, 2004.

(56) References Cited

U.S. PATENT DOCUMENTS

| | | |
|---|---|---|
| 5,675,710 A | 10/1997 | Lewis |
| 5,790,121 A | 8/1998 | Sklar et al. |
| 5,864,863 A | 1/1999 | Burrows |
| 5,895,470 A | 4/1999 | Pirolli et al. |
| 5,966,710 A | 10/1999 | Burrows |
| 6,021,409 A | 2/2000 | Burrows |
| 6,038,610 A | 3/2000 | Belfiore et al. |
| 6,154,213 A | 11/2000 | Rennison et al. |
| 6,175,830 B1 | 1/2001 | Maynard |
| 6,175,863 B1 | 1/2001 | Belfiore et al. |
| 6,256,622 B1 | 7/2001 | Howard, Jr. et al. |
| 6,397,219 B2 | 5/2002 | Mills |
| 6,442,544 B1 | 8/2002 | Kohli |
| 6,466,940 B1 | 10/2002 | Mills |
| 6,654,749 B1* | 11/2003 | Nashed ............... G06F 16/951 707/765 |
| 6,661,432 B1 | 12/2003 | Mcbrearty et al. |
| 6,675,205 B2 | 1/2004 | Meadway et al. |
| 6,751,612 B1 | 6/2004 | Schuetze et al. |
| 6,785,670 B1 | 8/2004 | Chiang et al. |
| 6,819,339 B1 | 11/2004 | Dowling |
| 6,823,491 B1 | 11/2004 | Mcbrearty et al. |
| 6,910,003 B1 | 6/2005 | Arnold et al. |
| 6,963,867 B2 | 11/2005 | Ford et al. |
| 6,963,869 B2 | 11/2005 | Burrows |
| 6,968,331 B2 | 11/2005 | Bar-Yossef et al. |
| 7,007,014 B2 | 2/2006 | Liu et al. |
| 7,016,892 B1 | 3/2006 | Kokkonen et al. |
| 7,028,027 B1 | 4/2006 | Zha et al. |
| 7,065,520 B2 | 6/2006 | Langford |
| 7,103,740 B1 | 9/2006 | Colgrove et al. |
| 7,130,466 B2 | 10/2006 | Seeber |
| 7,146,409 B1 | 12/2006 | Bushee et al. |
| 7,181,444 B2 | 2/2007 | Porter et al. |
| 7,200,804 B1 | 4/2007 | Khavari et al. |
| 7,240,045 B1 | 7/2007 | Bushee |
| 7,249,122 B1 | 7/2007 | Bushee et al. |
| 7,260,774 B2 | 8/2007 | Lambert et al. |
| 7,305,610 B1 | 12/2007 | Dean et al. |
| 7,308,643 B1 | 12/2007 | Zhu et al. |
| 7,395,333 B1 | 7/2008 | Saulpaugh et al. |
| 7,401,152 B2 | 7/2008 | Traversat et al. |
| 7,401,153 B2 | 7/2008 | Traversat et al. |
| 7,437,353 B2 | 10/2008 | Marmaros et al. |
| 7,447,678 B2 | 11/2008 | Taylor et al. |
| 7,472,118 B2 | 12/2008 | Hirst |
| 7,496,605 B2 | 2/2009 | Sudhi et al. |
| 8,527,337 B1* | 9/2013 | Lim ............... G06K 17/0032 434/354 |
| 2001/0037324 A1 | 11/2001 | Agrawal et al. |
| 2001/0044795 A1 | 11/2001 | Cohen et al. |
| 2001/0049677 A1 | 12/2001 | Talib et al. |
| 2002/0052894 A1* | 5/2002 | Bourdoncle ........ G06F 16/954 715/204 |
| 2002/0073115 A1 | 6/2002 | Davis |
| 2002/0087525 A1 | 7/2002 | Abbott et al. |
| 2002/0087535 A1 | 7/2002 | Kotcheff et al. |
| 2002/0091671 A1 | 7/2002 | Prokoph |
| 2002/0099730 A1 | 7/2002 | Brown et al. |
| 2002/0129062 A1 | 9/2002 | Luparello |
| 2002/0143932 A1 | 10/2002 | Quintero et al. |
| 2003/0037034 A1 | 2/2003 | Daniels et al. |
| 2003/0140044 A1 | 7/2003 | Mok et al. |
| 2003/0154186 A1 | 8/2003 | Goodwin et al. |
| 2003/0200300 A1 | 10/2003 | Melchione |
| 2003/0220913 A1 | 11/2003 | Doganata et al. |
| 2003/0225763 A1* | 12/2003 | Guilak ............... G06F 16/353 |
| 2003/0233350 A1 | 12/2003 | Dedhia et al. |
| 2004/0001104 A1 | 1/2004 | Sommerer et al. |
| 2004/0059809 A1 | 3/2004 | Benedikt et al. |
| 2004/0088577 A1 | 5/2004 | Render |
| 2004/0093327 A1 | 5/2004 | Anderson et al. |
| 2004/0103368 A1 | 5/2004 | Liu et al. |
| 2004/0111465 A1 | 6/2004 | Chuang et al. |
| 2004/0139169 A1 | 7/2004 | O'Brien et al. |
| 2004/0193591 A1 | 9/2004 | Winter |
| 2005/0010605 A1 | 1/2005 | Conrad et al. |
| 2005/0027699 A1* | 2/2005 | Awadallah ......... G06F 16/9535 |
| 2005/0055337 A1* | 3/2005 | Bebo ................ G06F 16/24575 |
| 2005/0055357 A1 | 3/2005 | Campbell |
| 2005/0160107 A1 | 7/2005 | Liang |
| 2005/0216457 A1 | 9/2005 | Walther et al. |
| 2005/0216533 A1 | 9/2005 | Berkhin |
| 2006/0004716 A1 | 1/2006 | Hurst-Hiller et al. |
| 2006/0112108 A1 | 5/2006 | Eklund et al. |
| 2006/0149708 A1 | 7/2006 | Lavine |
| 2007/0094230 A1 | 4/2007 | Subramaniam et al. |
| 2008/0071775 A1* | 3/2008 | Gross ................ G06F 16/951 707/999.005 |

OTHER PUBLICATIONS

Paul S. Bradley et al., "Scaling Clustering Algorithms to Large Databases." Proceedings of the 4th International Conference on Knowledge Discovery & Data Mining, 1998, pp. 9-15.

Yiming Yang et al., "A Re-Examination of Text Categorization Methods." Annual ACM Conference on Research and Development in Information Retrieval, 1999, pp. 42-49.

William Cohen et al., "Context-Sensitive Learning Methods for Text Categorization." ACM Transactions on Information Systems vol. 17 No. 2, Apr. 1999, pp. 307-315.

Thomas Hoffman, "Probabilistic Latent Semantic Analysis." Proceedings of Uncertainty in Artificial Intelligence, 1999, httn://www.cs.brown.edu/people/th/papers/Hofmann-UAI99.ps.

Michael Steinbach et al., "A Comparison of Document Clustering Techniques." KDD Workshop on Text Mining, 2000, http://citeseerx.ist.psu.edu/viewdoc/download?doi= 10.1.1.125.9225&rep=rep1 &type=pdf.

Rafael Calvo et al., "Intelligent Document Classification." Intelligent Data Analysis, 2000, http://www.ifir.edu.ar/~redes/ps/ida2000.ps.Z.

Yi Lin et al., "Support Vector Machines for Classification in Nonstandard Situations." University of Wisconsin Techical Report No. 1016, Mar. 14, 2000, http://citeseerx.ist.osu.edu/viewdoc/download?doi= 10.1.1.76.9824&rep=rep1&type=pdf.

Miguel Ruiz et al., "Hierarchical Text Categorization using Neural Networks." Information Retrieval, 2002, pp. 87-118.

Y. C. Fang et al., "Using clustering to boost text classification." Workshop on Text Mining, 2001, http://www-ai.ijs.si/DunjaMladenic/TextDM01/papers/Srini_TMIR.pdf.

Apple Computer Corporation, "Sherlock Channels." Released with MacOS 10.2, Aug. 2002, legacy document preserved at http://developer.apple.com/documentation/AppleApplications/Conceptual/Sherlock/Sherlock.pdf.

Mozilla Corporation, "Phoenix 0.2 (Santa Cruz) Release Notes and FAQ." Oct. 1, 2002, http://www.mozilla.com/en-US/firefox/releases/0.2.html.

Hannes Wettig et al., "Bayesian Analysis of Online Newspaper Log Data." Proceedings of the 2003 Symposium on Applications and the Internet Workshops, 2003, pp. 282-287.

Amit Agarwal, "Firefox SearchBar Hacks." Mar. 27, 2006, http://labnol.blogspot.com/2006/03/firefox-search-bar-hacks.html.

"Design and empirical evaluation of search software for legal professionals on the WWW", by Bert J. Dempsey et al., Information Processing and Management, vol. 36, Issue 2, Mar. 1, 2000, pp. 253-273.

"A framework for domain-specific search engine: design pattern perspective", by Zhang et al., IEEE International Conference on

(56) References Cited

OTHER PUBLICATIONS

Systems, Man and Cybernetics, 2003, Publication Date: Oct. 5-8, 2003, vol. 4, On pp. 3881-3886 vol. 4, ISSN: 1062-922X, ISBN: 0-7803-7952-7.
Peter Deutsch, "archie—An Electronic Discovery Service for the Internet." 1992; http://www1.chapman.edu/gopher-data/archives/Internet%20 Information/whatis.archie.
Michael F. Schwartz et al., "A Comparison of Internet Resource Discovery Approaches," Computing Systems 5(2), 1992.
F. Anklesaria et al., "The Internet Gopher Protocol," IETF Network Working Group RFC 1436, Mar. 1993; http://www.ietf.org/rfc/rfc1436.txt.
Oliver A. McBryan, "GENVL and WWWW: Tools for Taming the Web," First International Conference on the World Wide Web, 1994.
David Eichmann, "The RBSE Spider—Balancing Effective Search Against Web Load," First International Conference on the World Wide Web, 1994.
Martijn Koster, "ALIWEB—Archie-Like Indexing in the WEB," First International Conference on the World Wide Web, 1994.
M. St. Pierre et al., "WAIS Over Z39.50-1988." IETF Network Working Group RFC 1625, Jun. 1994; http://www.ietf.org/rfc/rfc1625.txt.
Osmar R. Zaiane et al., "Resource and Knowledge Discovery in Global Information Systems: A Preliminary Design and Experiment," Proceedings of the First International Conference on Knowledge Discovery and Data Mining, 1995, pp. 331-336.
C. Mic Bowman et al., "The Harvest Information Discovery and Access System," Computer Networks and ISDN Systems 1995, pp. 763-771.
Budi Yuwono et al., "WISE: A World Wide Web Resource Database System," IEEE Transactions on Knowledge and Data Engineering vol. 8, 1996, pp. 548-554.
Martijne Koster, "A Method for Web Robots Control." Dec. 4, 1996, http://www.robotstxt.org/norobots-rfc.txt.
Junghoo Cho et al., "Efficient crawling through URL ordering." Computer Networks and ISDN Systems 1998, pp. 161-172.
Sergey Brin et al., "The Anatomy of a Large-Scale Hypertextual Web Search Engine." Computer Networks and ISDN Systems 1998, pp. 107-117.
Jim Davis et al., "Dienst Protocol Specification," May 30, 2000 http://www.cs.cornell.edu/ cdlrg/dienst/protocols/DienstProtocol.htm.
Onn Brandman et al., "Crawler-Friendly Web Servers." Workshop on Performance and Architecture of Web Servers, Jun. 17-18, 2000.
Junghoo Cho et al., "The evolution of the web and implications for an incremental crawler." Proceedings of the 26th International Conference on Very Large Data Bases, 2000, pp. 200-209.
Sergey Melnik et al., "Building a Distributed Full-Text Index for the Web." Stanford InfoLab Technical Report, 2000. http://ilpubs.stanford.edu:8090/717/1/2000-55.pdf.
Michael Nelson et al., "The Open Archives Initiative Protocol for Metadata Harvesting Changes from OAI-PMH 1.1 to OA1-PMH 2.0," Protocol version 2.0 of Jun. 14, 2002 as described in document dated Dec. 7, 2008; http://www.openarchives.org/OAI/openarchivesprotocol.html.
Andy Powell et al., "Guidelines for Implementing Dublin Core in XML," Apr. 2, 2003; http://dublincore.org/documents/dc-xml-guidelines/.
Sun Microsystems, "Jini(TM) Technology Core Platform Specification, v2.0: Discovery and Join." Jun. 2003, http://java.sun.com/products/jini/2.0/doc/specs/html/discovery-spec.html.
Sun Microsystems, "Jini(TM) Technology Core Platform Specification, v2.0: Lookup Services." Jun. 2003, http://java.sun.com/products/jini/2.0/doc/specs/html/lookup-spec.html.
U.S. Appl. No. 60/457,909, filed Mar. 27, 2003.
Yi Lin et al., "Support Vector Machines for Classification in Nonstandard Situations." University of Wisconsin Techical Report No. 1016, Mar. 14, 2000, http://citeseerx.ist.psu.edu/viewdoc/download?doi=10.1.1.76.9824&rep=rep1&type=pdf.
H. Nielsen et al., "An HTTP Extension Framework," IETF, Request for Comments: 2774, total 20 pages (Feb. 2000).
R. Fielding et al., "Hypertext Transfer Protocol—HTTP/1.1," IETF, Request for Comments: 2616, total 176 pages (Jun. 1999).
Google Search User Help, accessindiana, 2002. (Year: 2002).
Bergholz, Andre, and Boris Childlovskii. "Crawling for domain-specific hidden web resources." Proceedings of the Fourth International Conference on Web Information Systems Engineering, 2003. WISE 2003.. IEEE, 2003. (Year: 2003).
U.S. Appl. No. 14/495,890, filed Sep. 25, 2014.
U.S. Appl. No. 13/270,221, filed Oct. 10, 2011.
U.S. Appl. No. 12/896,910, filed Oct. 3, 2010.
U.S. Appl. No. 11/069,288, filed Feb. 28, 2005.

* cited by examiner

CATEGORY-BASED SEARCH

CROSS REFERENCE TO RELATED APPLICATIONS

This application is a continuation of U.S. patent application Ser. No. 14/495,890, filed on Sep. 25, 2014, which is a continuation of U.S. patent application Ser. No. 13/270,221, filed on Oct. 10, 2011, now U.S. Pat. No. 8,862,580, which is a continuation of U.S. patent application Ser. No. 12/896,910, filed on Oct. 3, 2010, now U.S. Pat. No. 8,069,162, which is a continuation of U.S. patent application Ser. No. 11/069,288, filed on Feb. 28, 2005, now U.S. Pat. No. 7,831,581, which claims priority to U.S. Provisional Patent Application No. 60/549,524, filed on Mar. 1, 2004. All of the aforementioned patent applications are hereby incorporated by reference in their entireties.

FIELD OF THE INVENTION

The present invention relates generally to the area of information processing. More specifically, techniques relating to searching categorized data are disclosed.

BACKGROUND OF THE INVENTION

An increasing amount of information on a wide variety of subjects is being stored electronically, for example on a local machine or available through a network such as a corporate intranet or the public internet.

Currently available searches often return results in categories other than the category of information desired by a searcher. A lack of ability to specify a desired category of information, and receive results relating to that category, can lead to difficulty in obtaining desired search results and unwanted search results that can be cumbersome to review.

Accordingly, search capabilities based on category would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a non-transitory computer readable medium such as a computer readable storage medium, or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
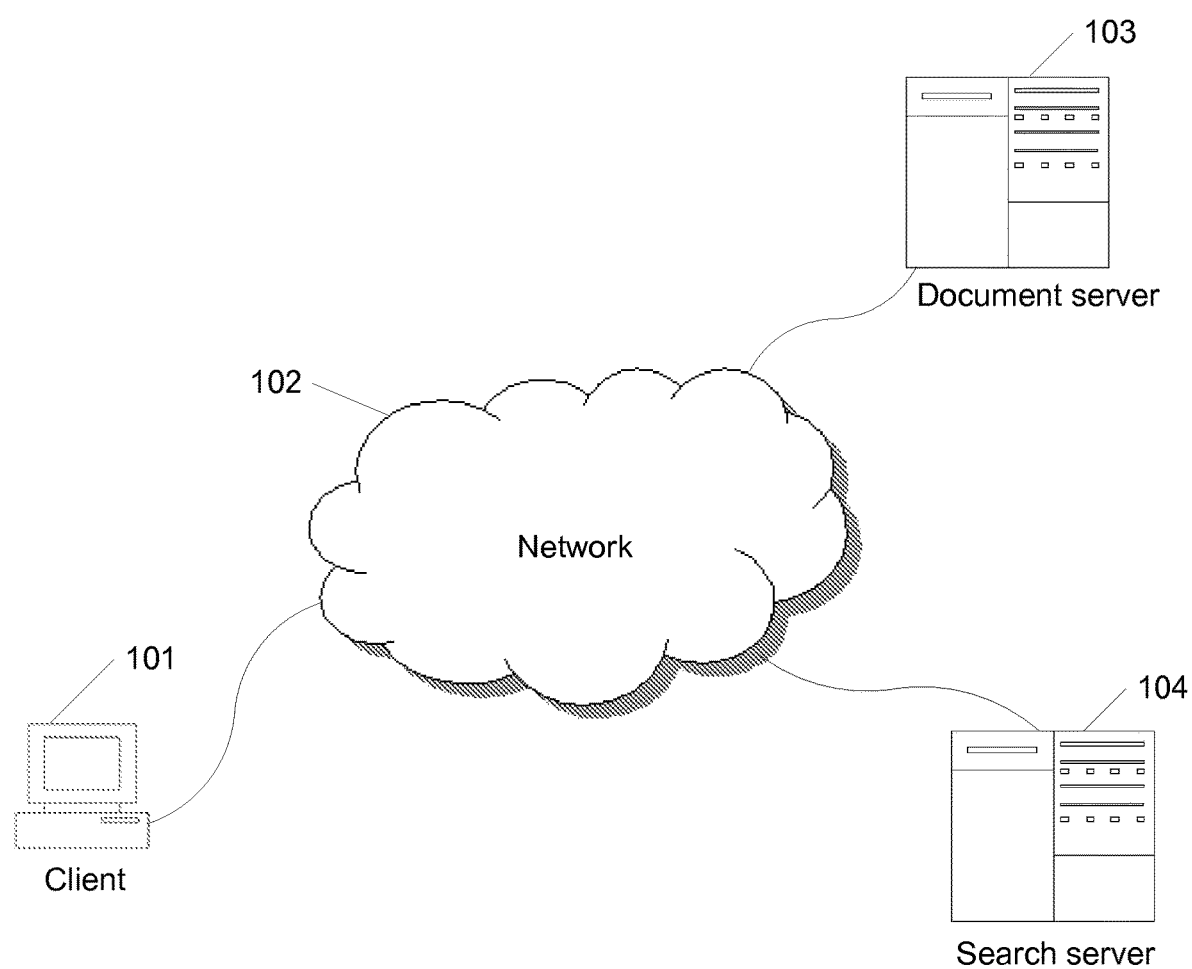
FIG. 1 is a diagram of a system for enhanced search, according to some embodiments.

FIG. 1 is a diagram of a system for enhanced search, according to some embodiments. In this example, a client 101 is connected to a network 102. A client may be any device capable of supporting an application that can perform or request an enhanced search, including a personal computer, PDA, or cell phone. In some embodiments, a client may have applications that provide enhanced search capabilities, for example as described in conjunction with FIGS. 2, 3, 4, 12, 14 and 17. The network 102 may be any type of network, for example a public network such as the internet or a cellular phone network. In another example, the network 102 may be an enterprise or home network, a virtual private network, or a wireless network such as an 802.11 or Bluetooth network.

A document server 103, such as a web server, may be connected to the network 102. The document server 103 may provide documents that may be searched, such as web pages. In some embodiments, a document server may provide information relating to locally available enhanced search capabilities, for example as described in conjunction with FIGS. 3 and 15.

A search server 104 may be connected to the network 102. In some embodiments, a search server may receive requests related to enhanced searching. In some embodiments, a search server 104 may provide document crawling and indexing functionality to support enhanced searches. Examples of enhanced search capabilities that may be provided by a search server 104 include those described in conjunction with FIGS. 2, 3, 5, 6, 9, 11, 13, 15, and 16.

Figure 2:
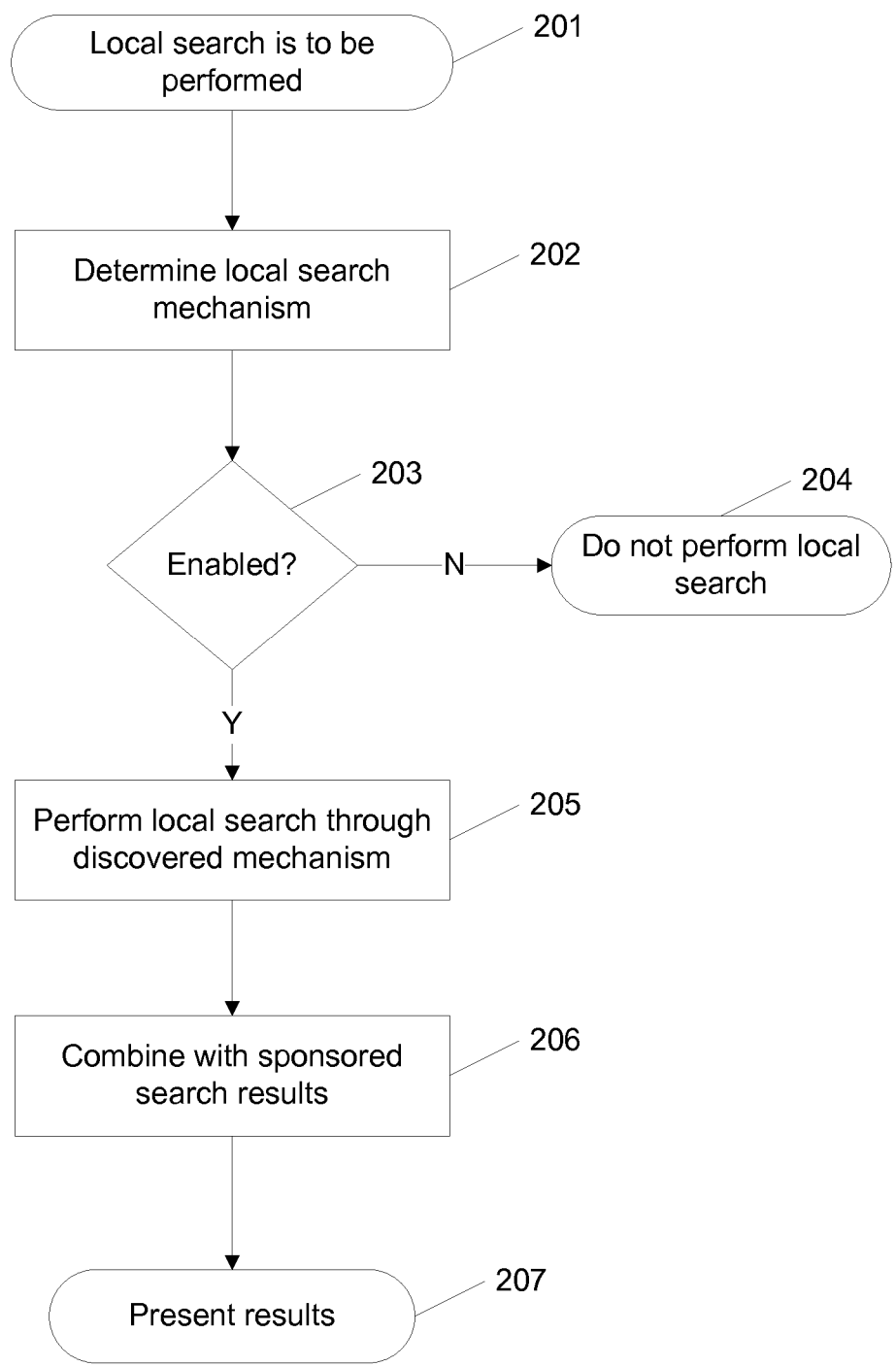
FIG. 2 is a flow diagram of a method for performing a local search, according to some embodiments.

FIG. 2 is a flow diagram of a method for performing a local search, according to some embodiments. A local search refers herein to any search relating to electronic documents, such as web pages or files, that may be provided by an electronic service associated with data being searched. An example of a service associated with data being searched is a search service, implemented as computer software, which may for example be associated with a web server, wherein search results associated with the search service refer primarily to documents that are made available by the web server. An example of an association between a local search service and a web server is control or operation of the local search service and the web server by the same entity. For example, an e-commerce company may provide a web server making web pages available, and a local search service that provides the ability to search solely those web pages, or those web pages and web pages associated with partners of the e-commerce company. In some embodiments, a local search may be associated with a current location being viewed, for example a URL associated with a document being viewed by a web browser. In some embodiments, the technique of FIG. 2 may be performed by a client such as client 101, for example by a document viewer such as a web browser.

In this example, a local search is to be performed (201). An example of a reason a local search may be performed is a user action explicitly or implicitly requesting a local search. In some embodiments, local search capabilities may be provided through a standard user interface. A standard user interface refers herein to one or more user interface elements that are associated with a public search service. A public search service refers herein to a search capability that is not specific to a particular document or location being viewed. One example of a public search service is a web search service such as Google, Yahoo! or MSN Search. An example of a standard user interface is a search bar such as the Google Toolbar (available over the internet from Google) that may have a text area for inputting one or more search terms and a pulldown option to perform a local search on a current web site, such as a site associated with the URL of a document being viewed, when browsing the internet. In another example, a context-sensitive user interface component may permit local searching, for example a local search option in a pulldown menu accessible via a right mouse click. In some embodiments, a local search option may be embedded within another option. For example, a "site search" option in a menu may have submenus for a local search and a restricted global search associated with a current location such as a URL associated with a document being viewed. A global search refers herein to a search provided by a service that is not associated with data being search, for example a web search service such as Google, Yahoo! Search or MSN Search. A restricted global search refers herein to a global search that may be restricted to local data. An example of a restricted global search is Google's "current site" search option, which can provide results of a global search that are associated with local data.

A local search mechanism may be determined (202). A local search mechanism refers herein to any way that a local search may be invoked, such as a programmatic interface. Examples of a local search mechanism specification include one or more of a query submission address, search term field name, other field values, referrer field name (or method of delivery, such as using REFERER keyword), and form posting method. In some embodiments, a local search mechanism specification may specify a standard search data format, for example a reference to an XML specification, and a location at which a search may be submitted. Examples of determining a local search mechanism are discussed in conjunction with FIG. 3.

If local searching is determined not to be enabled (203), then a local search is not performed in this example (204). An example of determining that a local search is not enabled is to determine that a local search is specifically prohibited. Another example of determining that a local search is not enabled is to determine that there is no available specification for a local search mechanism, or that a specified mechanism is not supported. An example of not performing a local search is to not perform a search. Another example of not performing a local search is to perform a restricted global search, for example a global search restricted to a site associated with the current location of a web browser. Examples of a site associated with a current location include a domain name associated with the current location and an enclosing directory of the current location.

If local searching is determined to be enabled (203), then a local search is performed through the discovered mechanism (205). One example of performing a local search is to perform the search directly through the discovered mechanism. Examples of mechanisms that may be used to perform a local search are discussed in conjunction with FIG. 3, and include submitting a web form, providing XML-formatted data to a search service, use of a protocol extension to HTTP, providing a search query to a designated restricted global search service, and providing a search query through other programmatic interfaces. Another example of performing a local search is to perform the search through a remote location such as a search server 104, for example as discussed in conjunction with FIG. 4.

In some embodiments, one or more sponsored search results may optionally be combined with the results of the local search (206). An example of a sponsored search result is a result such as a link that is associated with a monetary arrangement. Examples of monetary arrangements include payment for placement, payment for click-through, and payment for sale. Examples of sponsored links include sponsored links provided by search services such as Google or Overture. In some embodiments, information such as a location and/or search query may be transmitted to a search service, for example a service running on a search server 104, and sponsored links may be received and presented along with local search results. In some embodiments, a web service providing sponsored links may determine appropriate sponsored search results using a combination of one or more of the following: a set of sponsored links; analysis of contractual requirements and/or revenue projections for displaying particular sponsored links; a search location; a search query, a currently viewed page URL, aggregated information from the currently viewed page, and/or aggregated information from prior searches. In one example, sponsored search results may be intermingled with local search results. In another example, sponsored search results may be segregated from local search results. In various embodiments, combination of local and sponsored search results may be performed at a central location, or may be performed by a component in viewing software such as a browser or a plug-in thereto, for example the same component providing a standard search user interface. Examples of aggregated information from prior searches include recent search terms, recent page views, recent clickthrough results, cluster summaries of search terms, cluster summaries of clickthroughs, and cluster summaries of recently viewed pages.

Local search results and optional combined sponsored results may be presented (207). In one example, results may be presented in a window associated with a user interface element that launched a search. In a second example, results may be presented in a predetermined search window. In a third example, results may be presented in a pop-up window. In a fourth example, results may be presented in a sidebar window associated with a predetermined application, for example a web browser. Optionally, presentation, as well as other aspects of a standard search user interface such as location, visual appearance and options, and protocol preferences may be specified in a user, machine or enterprise specific manner, for example by storing configuration parameters in an information repository such as a local Windows registry or a database associated with a search server 104.

Figure 3:
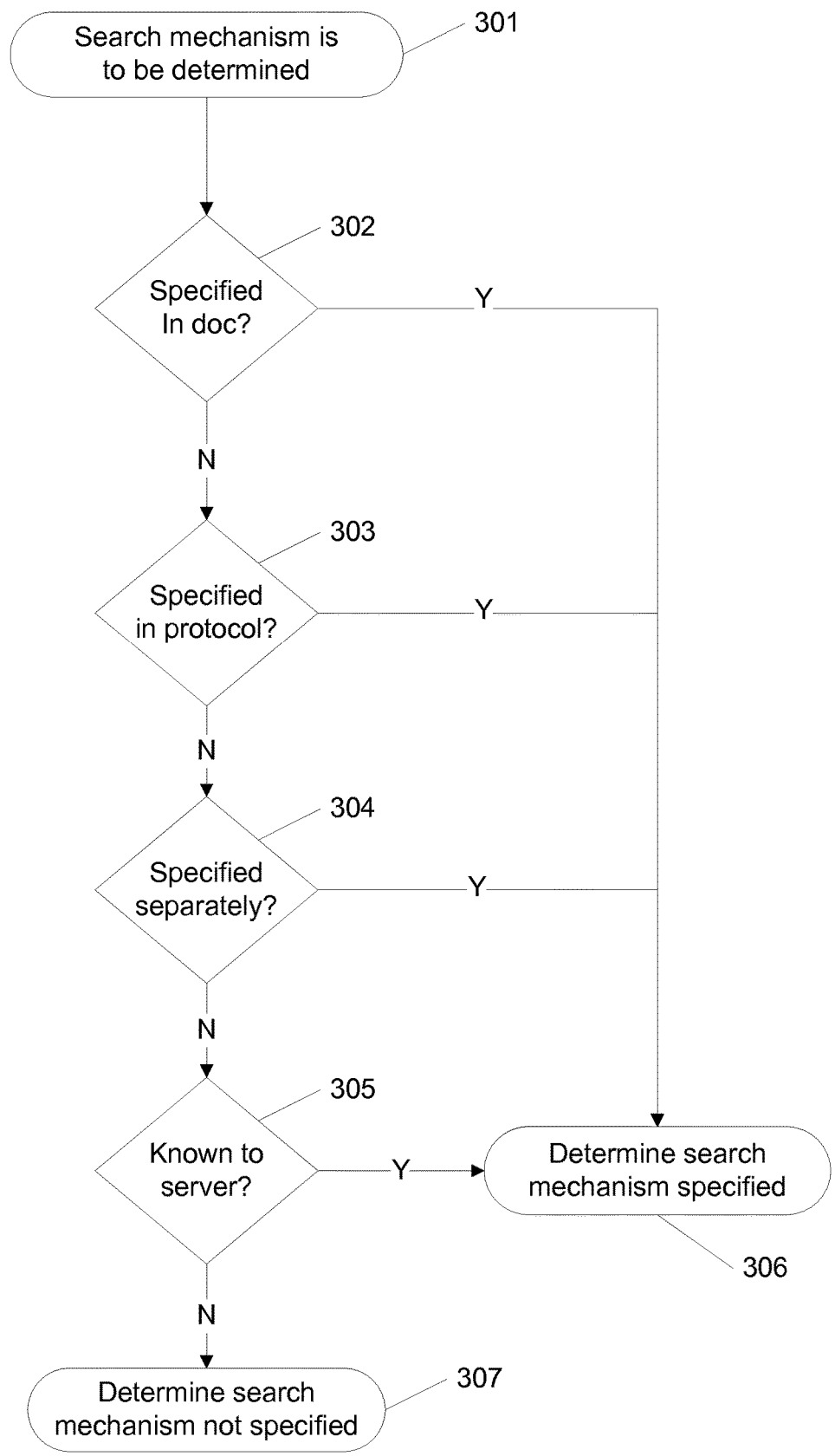
FIG. 3 is a flow diagram of a method for determining a search mechanism, according to some embodiments.

FIG. 3 is a flow diagram of a method for determining a search mechanism, according to some embodiments. One example of a search mechanism is a local search mechanism. Another example of a search mechanism is a global search restriction. A global search restriction refers herein to any restriction on a global search, for example a restriction of scope or type(s) of files to be searched. Examples of global search restrictions are discussed in conjunction with FIG. 9. Examples of a local search mechanism are discussed in conjunction with 202 of FIG. 2.

In this example, a search mechanism is to be determined (301). In various embodiments, a request to determine a local search mechanism may be provided as discussed in conjunction with 202 of FIG. 2, 402 of FIG. 4, or 602 of FIG. 6; or a request to determine a global search restriction may be provided as discussed in conjunction with 902 of FIG. 9.

It may be determined whether a document, such as a document being viewed, specifies a search mechanism (302). In some embodiments, the document may be analyzed to determine whether a search mechanism is specified. In a first illustrative example, a search mechanism may be specified using an HTML attribute in a document containing HTML. One example of an HTML attribute specifying a search mechanism is to provide a tag in an HTML form specifying that it is a search form. The following HTML form illustrates an example:

<FORM NAME="SEARCH"
ACTION=http://www.site.com/search.cgi
METHOD="GET">
Search:
<INPUT TYPE="TEXT" NAME="QUERY">
<INPUT TYPE="SUBMIT" VALUE="Search">
<INPUT NAME="REFERRER"
VALUE="http://www.site.com/directory/page.html"
TYPE=HIDDEN>
</FORM>
. . .

In this example, the NAME attribute naming the form "SEARCH" indicates that local search functionality is being provided. In some embodiments, a reserved attribute, such as SEARCH, may be used. The ACTION attribute specifies the URL to which a local search query may be submitted, the METHOD indicates that an HTTP GET may be used, and the field named QUERY (a reserved term in this sample, while in some embodiments a marker may be used on a field containing a query) may contain a search query. This example also includes a hidden field called REFERRER which may be passed into the form, with the value "http://www.site.com/directory/page.html," which represents the page containing the form. In this example, the values associated with ACTION, METHOD, QUERY and REFERRER may be determined to specify a local search mechanism. In some embodiments, a global search restriction may be similarly specified.

Another example of a document specifying a local search mechanism is for a document to provide information such as an HTML tag, for example a META tag, specifying an address at which a search query can be submitted, for example via an HTTP GET or HTTP POST operation specifying search terms. The following HTML code illustrates an example of such a use:

<HTML>
<HEAD>
<META NAME="SEARCH-LOCATION"
CONTENT="http://search.site.com">
<META NAME="SEARCH-ACTION" CONTENT="HTTP;POST">
<META NAME="SEARCH-FORMAT" CONTENT="STANDARD;1.0">
. . .

In this example, SEARCH-LOCATION indicates a location at which a local search function may be found (http://search.site.com in this example), an action to take at that location to submit a search query (an HTTP protocol form POST in this example), and a format specification for arguments, in this example "STANDARD" format arguments, version 1.0. In this example, the values associated with SEARCH-LOCATION, SEARCH-ACTION and SEARCH-FORMAT may be determined specify a local search mechanism. In some embodiments, a global search restriction may be similarly specified.

In a second example of determination of a search mechanism specified in a document, a search mechanism may be derived by analysis of HTML data, for example by looking for a form that may be submitted that contains the term "search" (for example in a name, submission button and/or other text) and using an INPUT whose type is "text" for terms (for example, the only text input field, or one whose associated text includes the word "search"), the URL specified in the form ACTION and posting method specified in the form METHOD.

In some embodiments, for example if a document being viewed is hierarchically structured from multiple sub-documents, checking whether a specification of a search mechanism is provided in a document may entail evaluating multiple sub-documents. An example of a hierarchically structured document is a document containing multiple sub-frames that may have entailed multiple GET operations. An example of multiple evaluating multiple sub-documents is to evaluate a frame that has focus, and if it did not have a search mechanism specification, to evaluate its parent, and so on upward until a root document is reached. In this example, the first encountered search mechanism specification may be used; or if no search mechanism specification is encountered, it is determined in this example that no search mechanism specification is provided in the document.

If it is determined that a search mechanism is specified in a document (302), then it is determined in this example that a search mechanism is specified (306). In some embodiments, in which the search mechanism is associated with a local search mechanism, the local search mechanism may be considered to be enabled and used to perform a local search, for example as described in conjunction with 205 of FIG. 2 or 508 of FIG. 5. In some embodiments, in which the search mechanism is associated with a restricted global search, a restricted global search may be performed using a specified restriction, for example as described in conjunction with 905 of FIG. 9 or 509 of FIG. 5.

If it is not determined that a search mechanism is specified in a document (302), then in this example it is determined whether a search mechanism was specified in a protocol (303). An example of a protocol-specified search mechanism is a search mechanism specified in response to a query such as an HTTP query. For example, when responding to a page request such as an HTTP GET, a web server may respond with information relating to a search mechanism in the HTTP response, for example using the HTTP Extension Framework specified in IETF RFC 2774, currently available over the internet from the Internet Engineering Task Force. An HTTP extension may optionally include a mechanism to provide a specification of a search mechanism, and/or information relating to configuring a search user interface component. In various embodiments, a protocol-based specification may specify a non-protocol-related search mechanism such as those described in conjunction with 302, or may specify a non-protocol-related search mechanism.

An example of a protocol-related search mechanism is for a search mechanism to be provided through a standard mechanism associated with a protocol such as HTTP. In a first example of a standard mechanism, a current URL may be truncated, for example to the last component of an associated path specifier (e.g. to the final separation by a "/" before any query string; for example http://www.company.com/directory/page.html?foo=bar/baz could be truncated to http://www.company.com/directory/) or to the domain name, and appended (including an intermediate "/" if necessary) with a standard name, such as search.cgi, and a standard encoding for search terms, such as "search=<terms>," and/or a standard method of contacting search functionality, such as HTTP GET. For example, a search query for "term1 term2 term3" from the page http://www.company.com/directory/page.html may be translated to an HTTP GET of http://www.company.com/directory/search.cgi?search=term1+term2+term3&referrer=page.html.

In a second example of a standard mechanism, local search may be provided via a filename extension or protocol variation applied to a URL from which a search is being performed. Examples of filename extension and protocol variation using the base URL http://www.company.com/directory/page.html include http://www.company.com/directory/page.srch and srch://www.company.com/directory/page.html respectively. In this example, the "srch" protocol may be any protocol that specifies that a search is being requested, for example to a web server. An example of a "srch" protocol is an extension to HTTP, as presently specified in IETF RFC 2616, currently available over the internet from the Internet Engineering Task Force. An example of an HTTP request with such an extension is:

SEARCH/directory/page.html HTTP/1.2
Connection: close
User-agent: Mozilla/6.0
Accept: text/html,text/plain
Accept-language: en
<search query>

In this illustrative HTTP request, the SEARCH method specifies that a search is being requested, and the request-URI, in this example/directory/page.html, provides a frame of reference ("referrer") for the local search to work from. An example of a frame of reference is a page being viewed at the time a user requested a search. Alternately, a "REFERER" (sic) request-header field may be used to indicate a frame of reference, in which case keywords may optionally be specified within the SEARCH Request-Line rather than within the Request-URI. A server receiving a local search request, for example via a protocol enhancement or via a filename extension, may determine it is a search request, invoke a local search function specifying a search query and optionally a referrer, and return results thereof, for example in HTML form, in plain text, or in a structured results format such as a predetermined XML format.

If it is determined that protocol-related information specifies a search mechanism (303), then it is determined in this example that a search mechanism is specified (306). In some embodiments, in which the search mechanism is associated with a local search mechanism, the local search mechanism may be considered to be enabled and used to perform a local search, for example as described in conjunction with 205 of FIG. 2 or 508 of FIG. 5. In some embodiments, in which the search mechanism is associated with a restricted global search, a restricted global search may be performed using a specified restriction, for example as described in conjunction with 905 of FIG. 9 or 509 of FIG. 5.

If it is not determined that protocol-related information specifies a local search mechanism (303), then in this example it is determined whether a search mechanism is separately specified (304). An example of a separate specification is a specification in a predetermined file associated with a directory or site, for example in a file named robots.txt, in which for one or more search mechanisms may be specified. Examples of search mechanism specifications are discussed in conjunction with 302. In some embodiments, a separate specification may include specifications for more than one separate address, such as varying specifications for local and/or restricted global search mechanisms for multiple paths within a site. In some embodiments, a robots.txt file may specify one or more search mechanisms as a "User-Agent" with any required information about searching the site, either specific to a particular search component or generally applicable, as "Disallow:". Alternately, extension keywords that specify information relating to a search mechanism may be added, as in this example:

User-agent: *
Disallow: /private
Local-search-agent: Microsoft-Local-Interface
Version: 1.0
Location: /search
Global-search-agent: Google
Scope: /directory In this illustrative robots.txt file, some general information for web crawlers is specified. In addition, the availability of a local search mechanism is specified as an available interface of the type "Microsoft-Local-Interface" version 1.0, with a submission location of the "/search" directory of the current site. A specification is also provided for a restricted global search, specifying a preferred restricted global search agent of Google and a scope of "/directory," which in this example specifies that a restricted global search in the directory containing the robots.txt file should be performed as a restricted global search in the "/directory" directory of the current site.

In some embodiments, a request not to perform a local search through a standard user interface may be provided. A request not to perform a local search may be detected using any local search discovery mechanism. In some embodiments, when a request not to perform a local search is detected, a user option to perform a local search may be disabled (for example, by graying out a user interface element, or removing it completely), and/or a restricted global search may be performed when a local search option is selected.

In some embodiments, a local search may be specified to be performed by a global search service. Such a specification may be provided through any local search discovery mechanism, such as within a document, associated with a protocol, as a standard mechanism, etc. For example, a site or page, while not providing local search services, may specify that Google may be used to search the site through a standard user interface, which may override a default search capability that might otherwise be used. In some embodiments, locally specified restricted global searches may be presented to a user as local searches through a standard user interface. In some embodiments, locally specified global searches may interact with specified global search restriction(s), if any, and may specify additional restriction(s) to a global search in an interface specification.

If it is determined that a search mechanism is separately specified (304), then it is determined in this example that a search mechanism is specified (306). In some embodiments, in which the search mechanism is associated with a local search, the local search mechanism may be considered to be enabled and used to perform a local search, for example as described in conjunction with 205 of FIG. 2 or 508 of FIG. 5. In some embodiments, in which the search mechanism is associated with a restricted global search, a restricted global search may be performed, for example as described in conjunction with 905 of FIG. 9 or 509 of FIG. 5.

If it is not determined that a search mechanism is separately specified (304), then in this example it is determined whether a search mechanism is known to a server (305). A search server such as search server 104 may be contacted, for example via a network such as network 102. A response may be received from the search server containing a specification of a search mechanism, or an indication that a search mechanism is not known to the search server. Examples of determining whether a search mechanism is known to a server are discussed in conjunction with FIG. 5. In some embodiments, the server may return information relating to a search mechanism. In some embodiments, for example as described in conjunction with FIG. 4, the server may perform the search and return results of the search.

If it is determined that a search mechanism is known to a search server (305), then it is determined in this example that a search mechanism is specified (306). In some embodiments, in which the search mechanism is associated with a local search, the local search mechanism may be considered to be enabled and used to perform a local search, for example as described in conjunction with 205 of FIG. 2 or 508 of FIG. 5. In some embodiments, in which the search mechanism is associated with a restricted global search, a restricted global search may be performed using a restriction specification, for example as described in conjunction with 905 of FIG. 9 or 509 of FIG. 5.

If it is not determined that a search mechanism is known to a search server (305), then in this example it is determined that a search mechanism is not specified (307). As one example, an indication that a local search mechanism is not enabled may be provided to 203 of FIG. 2. As another example, an indication that a global search restriction is not present may be provided to 903 of FIG. 9. In some embodiments, a specification for a restricted global search, such as a restriction to a directory, site or domain associated with a location of the current document or a restriction as to one or more types of files to match with search terms, may be provided to 203 of FIG. 2.

Figure 4:
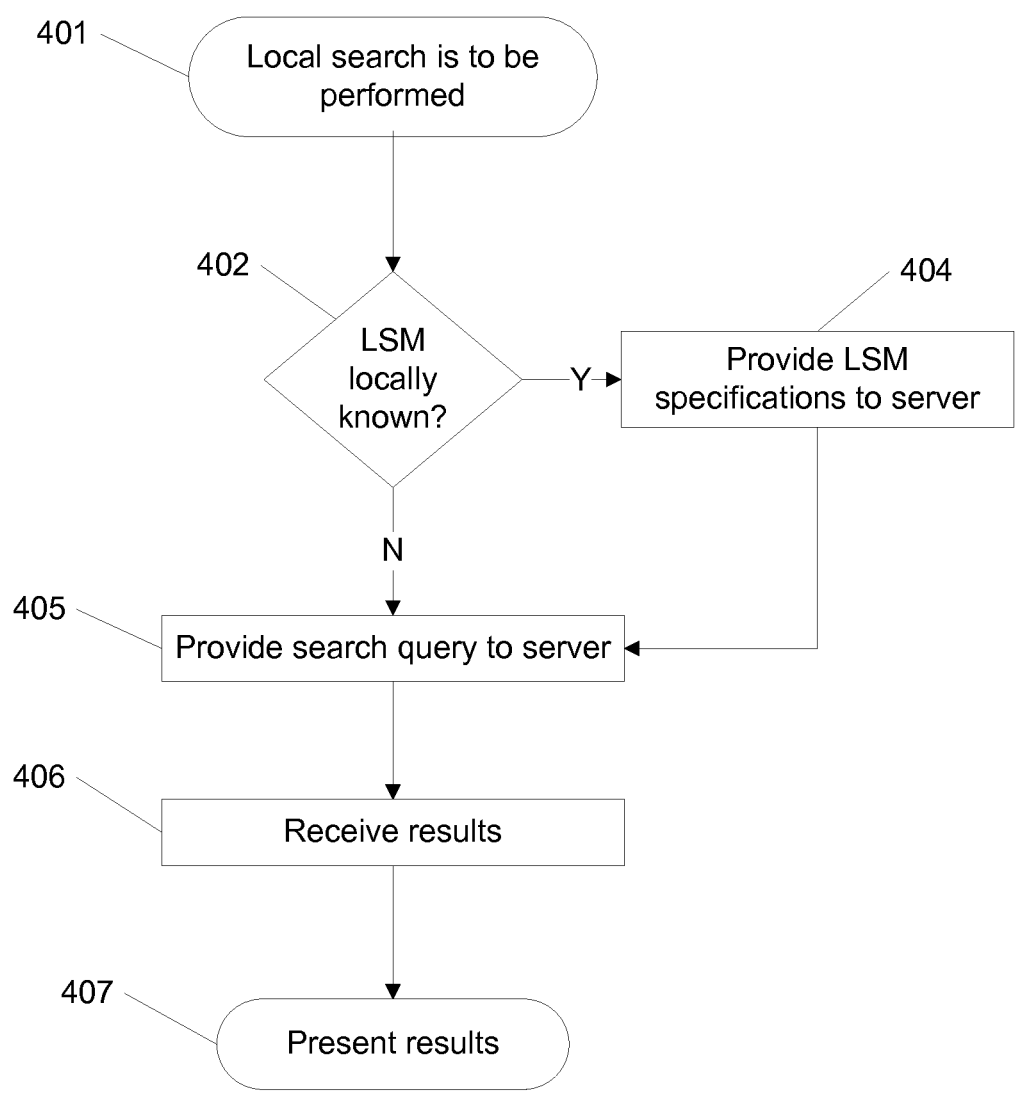
FIG. 4 is a flow diagram of a method for performing a local search in conjunction with a server, according to some embodiments.

FIG. 4 is a flow diagram of a method for performing a local search in conjunction with a server, according to some embodiments. In some embodiments, the technique of FIG. 4 may be performed by a client such as client 101, for example by a document viewer such as a web browser. In this example, a local search is to be performed (401). In some embodiments, a local search may be associated with a current location, such as a URL associated with a document being viewed. It may be determined whether a local search mechanism (LSM) is locally known (402). Examples of determining whether a local search mechanism is known include determining whether a local search mechanism is specified in a document, in a protocol, or separately, for example as described in conjunction with 302, 303 and 304 respectively of FIG. 3.

If it is determined that a local search mechanism is locally known (402), then in this example a specification of the local search mechanism is provided to a server (404). A specification of a search query may be provided to a server (405). In some embodiments, specification of the search query may be combined with specification of the local search mechanism. A query and optional local search mechanism specification may, for example, be provided using a TCP/IP connection over the internet to a server such as search server 104. In some embodiments, a query may include a specification of a location associated with a document being viewed or with a document viewer (for example, a URL that a browser is rendering), or may use the referrer field in an HTTP connection to provide a specification of a location. An example of a query specification is "local:<localURL>+<search query>," which in this example may specify a local search for <search query> based on the location <localURL>. In this example, a local search from a search toolbar for "search text" at http://www.site.com/directory/page.html may pass "local:www.site.com/directory/page.html+search+text" back to a search server for processing.

Search results may be received from a server (406). Examples of search results include display-ready search results such as an HTML document, and structured data such as XML-formatted results. In some embodiments, search results received from a server may include sponsored links, for example as discussed in conjunction with 510 of FIG. 5. Search results may be presented (407). Examples of presenting search results are discussed in conjunction with 207 of FIG. 2.

Figure 5:
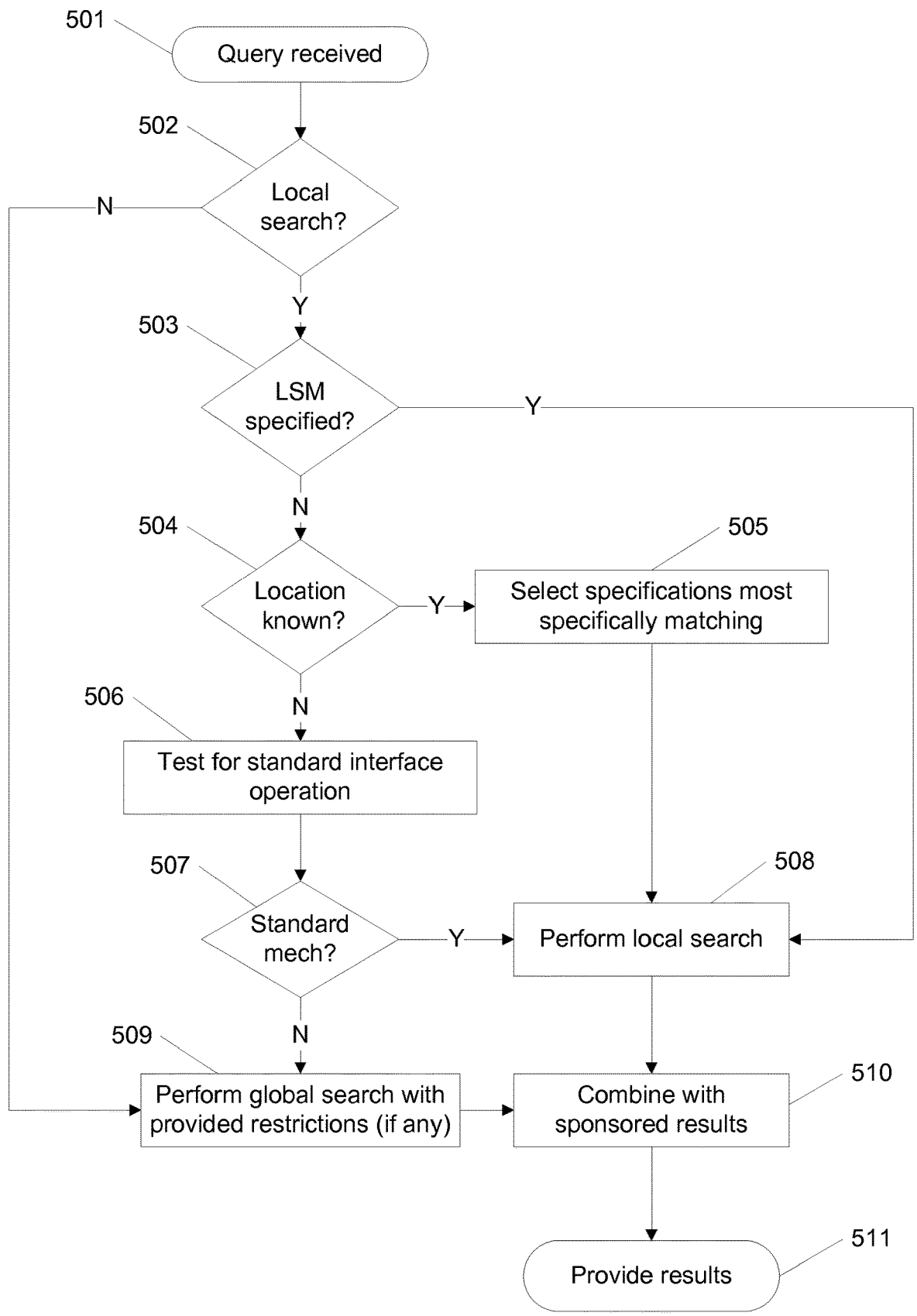
FIG. 5 is a flow diagram of a method for responding to a search query, according to some embodiments.

FIG. 5 is a flow diagram of a method for responding to a search query, according to some embodiments. In some embodiments, the technique of FIG. 5 may be performed by a server such as search server 104 of FIG. 1. In this example, a query is received (501). One example of a query is a query to determine whether a search mechanism for a provided location is known to the server, for example as discussed in conjunction with 305 of FIG. 3. Another example of a query is a query including one or more search terms and optionally a specification of a local search mechanism, for example as discussed in conjunction with 405 of FIG. 4. Another example of a query is a query containing one or more search terms and optionally a global search restriction specification, for example as described in conjunction with 903 and 905 of FIG. 9.

It may be determined whether the query is associated with a local search (502). An example of determining whether the query is associated with a local search is to determine whether a local search is specified, implicitly or explicitly, in the query. An example of an explicit specification in a query is an indicator such as "local" that specifies a local search. An example of an implicit specification is submission of the query to a location, such as a particular server and/or network port, that has been designated to handle local search queries. If it is determined that the query is not associated with a local search (502), then a global search, such as a restricted global search, is performed in this example (509). An example of a restricted global search is a Google search with "site:XXX" specified in the search query, wherein XXX refers to a domain associated with the provided location. In some embodiments, a provided global search restriction, such as a scope or type(s) of files to match, may be used in conjunction with the global search. In some embodiments, a global search restriction associated with a provided location may be determined. An example of determining whether a global search restriction is known is to check to see whether a specification of a restriction is associated with a provided location in a data repository such as a file or database. Examples of associations of locations and search restrictions are discussed in conjunction with 504. Search results, if created, may optionally be combined with sponsored results (510), and results may be provided (511).

It may be determined whether a local search mechanism (LSM) is specified (503). A local search mechanism may, for example, have been specified as discussed in conjunction with 404 of FIG. 4. Examples of local search mechanisms are discussed in conjunction with 202 of FIG. 2. If it is determined that a local search mechanism was specified (503), then in this example a local search is performed using the specified local search mechanism (508). Examples of performing a local search are discussed in conjunction with 205 of FIG. 2.

If it is determined that a local search mechanism was not specified (503), then in this example it is determined whether a local search mechanism associated with a provided location is known (504). An example of determining whether a local search mechanism is known is to check to see whether a local search mechanism specification is associated with a provided location in a data repository such as a file or database.

In some embodiments, specifications of search mechanisms such as local search mechanisms and/or global search restrictions may be stored in a data repository. For example, a search location such as a site, directory or page and optionally an associated local search mechanism specification or preferred restricted global search provider and/or restriction(s) may be determined, for example as discussed in conjunction with FIG. 3. In some embodiments, a search location may be associated with search mechanism related information from manual cataloguer entries, submissions from site owners or visitors, data found by an indexer as described in conjunction with FIG. 6, and/or data transmitted when local searches are performed, for example as discussed in conjunction with 404 of FIG. 4. As an example of manual cataloguer entry, a server may be manually augmented to facilitate local searches or restricted global searches on a site that supports web hierarchies for multiple individual users, for example a web hosting service. A cataloguer providing specifications for such a web hosting service may, for example, provide a hierarchy prefix for the web hierarchy, such as http://www.webhost.com/webpages/, and provide a filter that may be applied to results, for example a filter that specifies a scope of results, file type(s) of results, or other restriction. An example of a filter is to specify that search results for searches initiated from http://www.webhost.com/webpages/~username/* may be restricted to finding matches that are of the form http://www.webhost.com/webpages/~username/*, wherein username may match any user directory name.

If it is determined that a local search mechanism is known (504), then in this example a specification most closely matching the location is selected (505). An example of the specification most closely matching the location is the specification from among several matching specification that is associated with a location that most closely matches the provided location, for example by having the greatest depth of matching subdomains and/or directories. An example of determining the most closely matching specification is to look up the specified URL in a database, fall back to successive enclosing directories if there is no entry for the URL, and falling back to a (sub)domain if there is no entry for an enclosing directory.

A local search may optionally be performed using the local search mechanism (508). Examples of performing a local search are discussed in conjunction with 205 of FIG. 2. In some embodiments, cached local search results may be retrieved. In some embodiments, local search results may optionally be combined with sponsored results (510), for example as discussed in conjunction with 206 of FIG. 2. Results may be provided (511). One example of providing results is to provide search results, for example search results as discussed in conjunction with 508 and/or 510, to a requestor. Search results may, for example, be provided to a client as discussed in conjunction with 406 of FIG. 4. Another example of providing results is to provide a specification of the local search mechanism that has been determined to be associated with the provided location. A local search mechanism specification may, for example, be provided to a client as discussed in conjunction with 305 of FIG. 3.

If it is not determined that a local search mechanism is known (504), then in this example one or more standard local search mechanisms are optionally tested (506). Examples of standard local search mechanisms are discussed in conjunction with 303 of FIG. 3. Examples of testing a standard local search mechanism include submitting a specified search query through the standard mechanism, and submitting a dummy search query through the standard mechanism; and evaluating a result of the query to determine if the standard mechanism is supported. If it is determined that a standard local search mechanism is supported (507), then in this example a local search is optionally performed using the standard mechanism (508), results may optionally be combined with sponsored results (510), and results may be provided (511).

If it is not determined that a standard mechanism is supported (507), then in this example a restricted global search is optionally specified and/or performed (509). An example of a restricted global search is a Google search with "site:XXX" specified in the search query, wherein XXX refers to a domain associated with the provided location. In some embodiments, a provided global search restriction, such as a restriction in scope or type(s) of matching files, may be used in conjunction with the global search. In some embodiments, a global search restriction associated with a provided location may be determined, for example as described in conjunction with 504. Search results, if created, may optionally be combined with sponsored results (510), and results may be provided (511).

Figure 6:
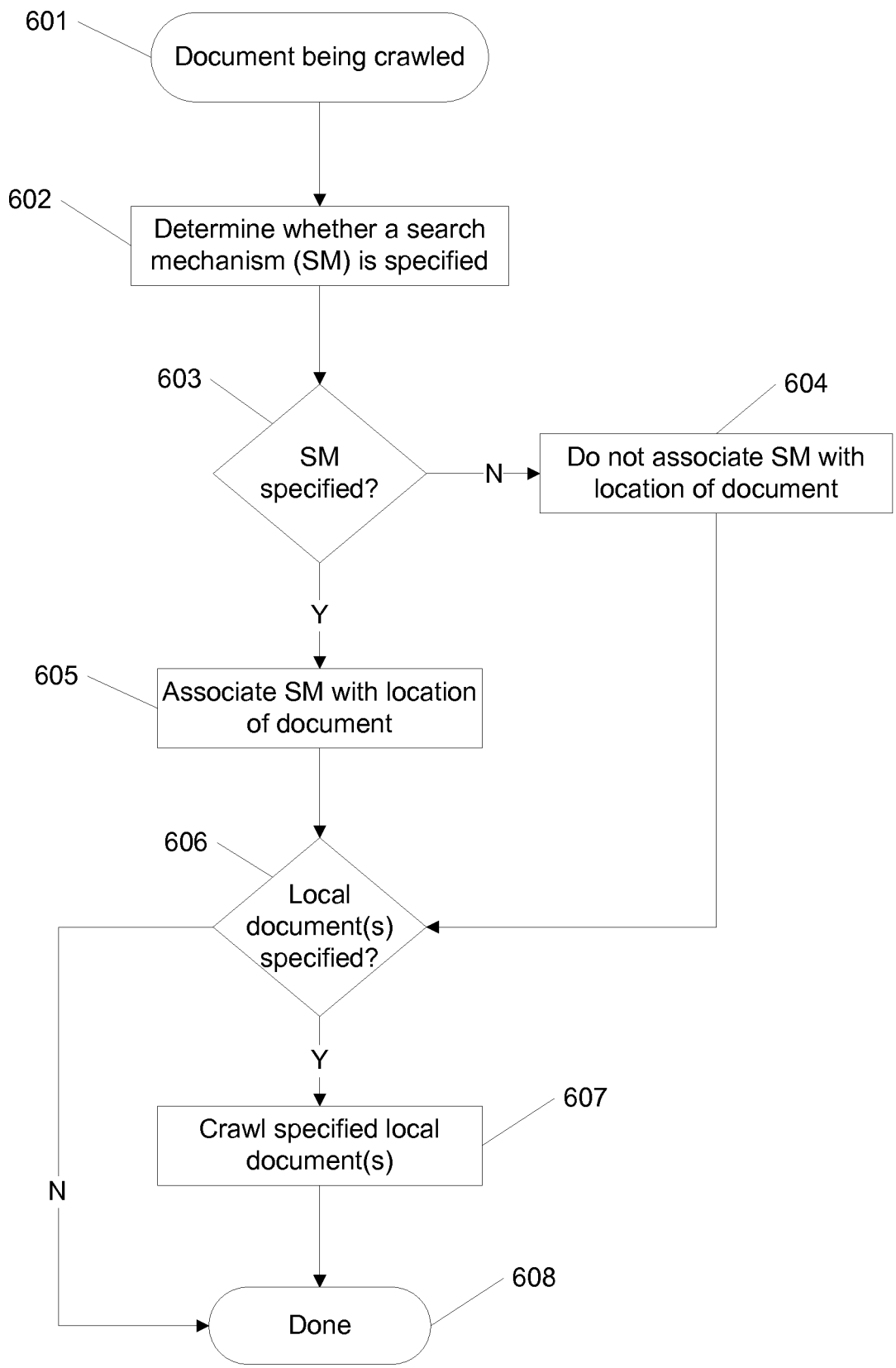
FIG. 6 is a flow diagram of a method for a document crawler, according to some embodiments.

FIG. 6 is a flow diagram of a method for a document crawler, according to some embodiments. A document crawler refers herein to any program that processes information relating to an interconnected set of documents. In some embodiments, a document crawler may be used to gather information relating to searching. An example of a document crawler is a search engine indexer such as a web crawler or spider. Another example of a document crawler is a computer program that processes a file or a list of files, for example a file from a list of files generated by a web crawler of spider, wherein processing a file includes extracting information relating to searching. Another example of a document crawler is a computer program that determines files that may be indexed. Examples of web crawlers include Heretrix, currently available as open-source software from the Internet Archive, and WebSphinx, currently available as open-source software from Carnegie-Mellon University. In this example, a document is being crawled (601). Examples of a document include a web page, an office productivity document such as a word processing document, presentation or spreadsheet, a text file and a directory. In some embodiments, a document may include a document containing an enumeration of one or more local documents that may be searched, for example as described in conjunction with 703 of FIG. 7.

It may optionally be determined whether a search mechanism is specified (602). Examples of a search mechanism include a local search mechanism and a global search restriction. Examples of determining whether a search mechanism is specified are discussed in conjunction with 302, 303 and 304 of FIG. 3, and include specification within the document, specification relating to a protocol associated with the document, and separate specification. An example of a separate specification is a file, for example a file named robots.txt, that provides a specification of a search mechanism. An example of a robots.txt file specifying a search mechanism is discussed in conjunction with 304 of FIG. 3. Examples of global search restrictions are discussed in conjunction with FIG. 9.

If it is determined that one or more search mechanisms are specified (603), then in this example the specified search mechanism(s), such as a local search mechanism and/or a global search restriction, are associated with a location related to the document (605). For example, a specification of a search mechanism may be associated with a location related to the document, such as the web site and directory containing the document, in a data repository such as a file or database. Examples of associations of document locations and local search mechanism specifications are discussed in conjunction with 504 of FIG. 5. If it is determined that no search mechanism is specified (603), then no association is made in this example (604).

It may optionally be determined whether one or more local searchable documents are specified (606). In some embodiments, one or more local searchable documents may be specified in a document with searchable content, such as an HTML file. In some embodiments, one or more local searchable documents, for example file(s) such as web page(s), may be specified in a file without searchable content, such as a file named robots.txt. An example of specifying a file is to provide the name of the file. Another example of specifying a file is to provide a specification of a set of files, wherein the set contains the file. Examples of specifications of local searchable documents are described in conjunction with FIG. 7.

If it is determined that one or more local searchable documents are specified (606), then one or more specified documents are crawled in this example (607). Examples of crawling a document include indexing its contents, processing links contained within it, processing it as discussed in this FIG. 6, and adding it to a list of documents to be crawled.

If it is determined that no local searchable documents are specified (606), or if one or more local searchable documents have been crawled (607), then processing is complete in this example (608). In some embodiments, further processing may be performed. Examples of further processing include indexing contents of the document, and crawling one or more documents linked to by the document.

Figure 7:
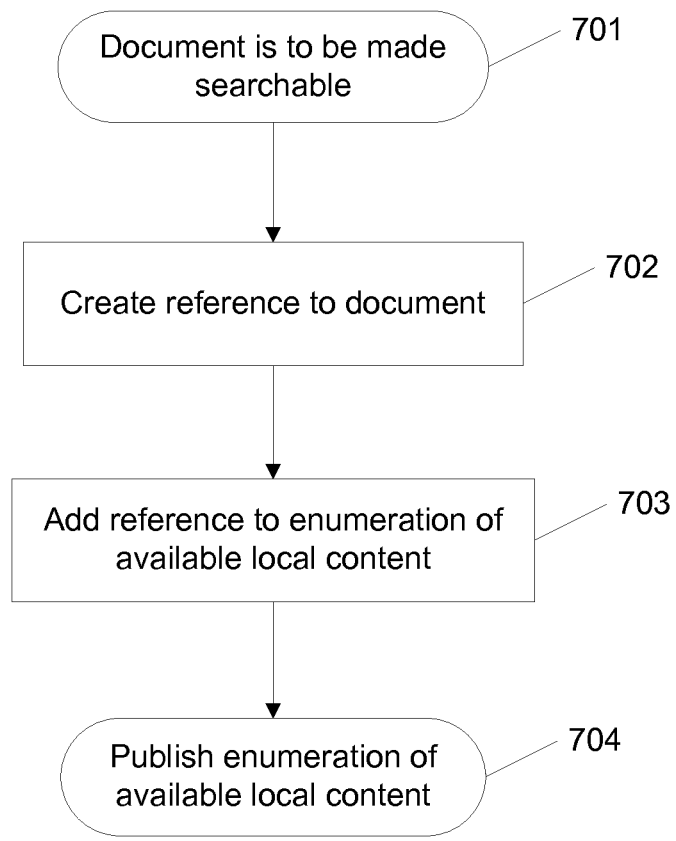
FIG. 7 is a flow diagram of a method for making a local document searchable, according to some embodiments.

FIG. 7 is a flow diagram of a method for making a local document searchable, according to some embodiments. In this example, a document is to be made searchable (701). An example of a document that may be made searchable is a document that is not directly linked to by another document, for example a document that is available through a local search query or a form submission. A reference to the document may be created (702). An example of a reference to the document is a reference to a location associated with the document, such as a path or URL. Another example of a reference to a document is inclusion of the document in a specification of a set of documents. An example of a specification of a set of documents is a specification of multiple names of documents, such as files whose names contain a specified range of characters or numbers.

The reference to the document may be added to an enumeration of local content (703). An enumeration refers herein to any specification of one or more documents, wherein the specification will not normally be rendered by a document viewer such as a web browser. An example of an enumeration of local content is a list of one or more documents and/or ranges of documents. In some embodiments, an enumeration may be included in a document with searchable content, such as an HTML document, for example a document that may be indexed by a crawler such as a web crawler. An example of providing an enumeration in an HTML file is to provide a tag that has no visible result when rendered by a browser, which may for example be included in the head or body of an HTML document. An example of a tag specifying a searchable document is <INDEX>filename</INDEX>, wherein "filename" is a searchable file. In some embodiments, an enumeration may be included in a document without searchable content, such as a robots.txt file. The following is an illustrative example of a robots.txt file with an included enumeration:

User-agent: *
Disallow: /private
Local-search-agent: Microsoft-Local-Interface
Version: 1.0
Location: /search
Global-search-agent: Google
Scope: /directory
Index-local-files: unlinked-harmonica-info.htm
Index-local-files: harmonica[23-25].htm
Index-local-files: /products/hohner[0001-0328].php In this illustrative robots.txt file, in addition to general information relating to indexing and information relating to a local search mechanism and a global search restriction, as described in conjunction with 304 of FIG. 3, an enumeration of local documents is specified, including a single document and two ranges of documents. In this example, a range is specified by a start and end of an inclusive range, separated by a hyphen and enclosed within square brackets. The single document is unlinked-harmonica-info.htm, which in this example may be interpreted to be present in the same directory as the robots.txt file. The first range in this example refers to the three files harmonica23.htm, harmonica24.htm and harmonica25.htm, in the current directory. The second range in this example refers to 328 files, consecutively numbered from hohner0001.php through hohner0328.php, in the /products directory. In some embodiments, names may be provided that are relative to a directory in which they were specified, for example a directory containing a robots.txt file.

The enumeration of available local content may be published (704). An example of publishing the enumeration is to make a document containing the enumeration publicly available, for example by including the enumeration in a robots.txt file and making the file available at a location it may be found by a crawler such as a web crawler.

Figure 8:
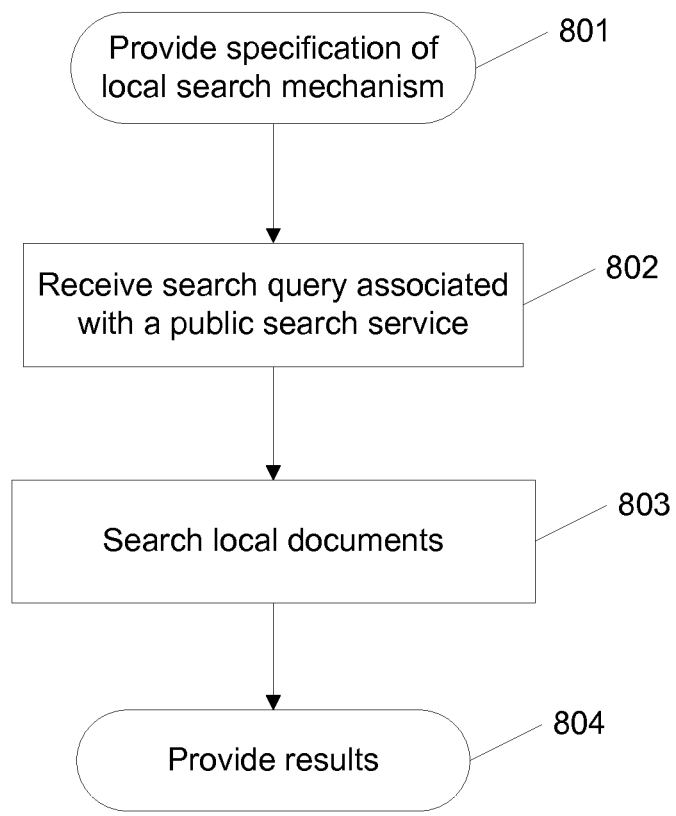
FIG. 8 is a flow diagram of a method for providing a local search, according to some embodiments.

FIG. 8 is a flow diagram of a method for providing a local search, according to some embodiments. In this example, a specification of a local search mechanism may be provided (801). Examples of local search mechanism specifications are provided in conjunction with FIG. 3. Examples of providing a specification of a mechanism include providing a document such as an HTML document that contains a specification of a local search mechanism, providing a protocol-related search mechanism specification, for example in an HTTP response, and providing a separate specification, for example a file such as a robots.txt file that includes a specification of a local search mechanism. In some embodiments, a specification may be provided implicitly, for example by providing a local search through a standard mechanism.

A search query may be received from a public search service (802). One example of a public search service is a web search service such as Google, Yahoo! or MSN Search. Another example of a public search service is a user interface element in a client that may be used to perform public searches, for example a user interface element associated with a search toolbar in a web browser. In some embodiments, the query may have been sent as described in conjunction with 205 of FIG. 2 or 508 of FIG. 5. In some embodiments, the search query may conform to the specification that was provided in 801. In some embodiments, a search query may be received by the same entity that provided a specification of a local search mechanism as described in conjunction with 801. In some embodiments, a search query may be received by a different entity than the entity that provided a specification of a local search mechanism as described in conjunction with 801, for example a server such as search server 104 that was identified in the specification.

Local data may be searched (803). Local data refers herein to data that is associated with the entity performing the search. An example of searching local data is to search local data for documents containing one or more search terms associated with the search query. Results may be provided (804). Examples of providing results are provided in conjunction with 511 of FIG. 5. In some embodiments, results may be provided to the public service, and may for example be received as described in conjunction with 205 of FIG. 2 or 508 of FIG. 5.

Figure 9:
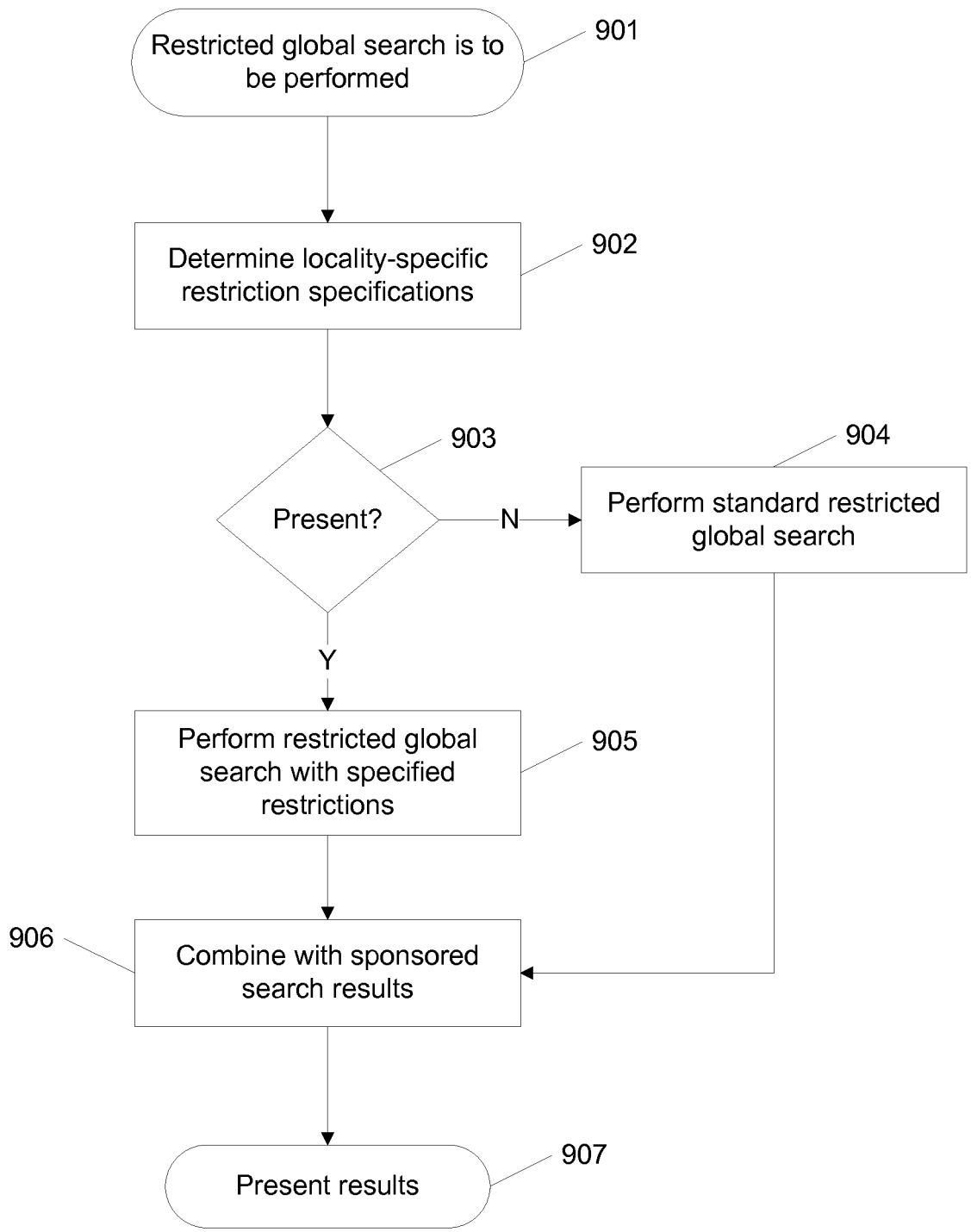
FIG. 9 is a flow diagram of a method for performing a restricted global search, according to some embodiments.

FIG. 9 is a flow diagram of a method for performing a restricted global search, according to some embodiments. In some embodiments, the technique of FIG. 9 may be performed by a client such as client 101. In this example, a restricted global search is to be performed (901). An example of a reason a restricted global search may be performed is a user action explicitly or implicitly requesting a restricted global search, such as selecting "site search" from a search toolbar such as the Google search toolbar. In another example, a context-sensitive user interface component may permit restricted global searching, for example a local search option in a pulldown menu accessible via a right mouse click.

It may be determined whether one or more search restriction specifications are associated with a current location such as the address of a web page currently being viewed (902). Search restriction specifications may be specified similarly to local search mechanisms, for example as described in conjunction with FIG. 3. In some embodiments, search restriction specifications may be been determined by a document crawler, for examples as described in conjunction with FIG. 6.

Search restriction specifications refer herein to any information that relates to specifying a set of pages that may be searched. An example of a search restriction is a restriction in scope to a domain, subdomain or directory to be searched. In one example, a search restriction specification may include one or more partial URLs, for example the beginning of a URL that specifies a domain name, and optionally one or more subdomains and/or (sub)directories, which can be matched against URLs of pages to be searched and/or pages that match the search query, before they are presented to a user. In another example, a search restriction specification may include one or more regular expressions which may be used as filters, for example by generating results for the current domain and presenting only results whose URLs match one or more (or all) of the regular expressions contained in a search restriction specification. In another example, a search restriction specification may include a specification associated with a domain or directory, specifying a level at which searches from lower levels should apply. For example, www.geocities.com might have a level of 1, indicating that a restricted global search from anywhere inside a first-level directory such as http://www.geocities.com/harmonica-lovers/ would find other pages within the harmonica-lovers directory, for example exclusively all matches within the harmonica-lovers directory and its subdirectories.

Another example of a search restriction is a restriction on a type of document that should or should not be returned in a search result associated with a particular domain, subdomain or directory level. For example, a search restriction specification may indicate that only HTML files, or HTML or PDF files, should be matched in a search.

If no locality-specific search restriction specifications are determined to be present (903), then a standard restricted global search, for example a restricted global search associated with a current domain, subdomain or directory level with otherwise default settings, is performed in this example (904). Search results may optionally be combined with sponsored results (905), for example as described in conjunction with 206 of FIG. 2, and results may be presented (907), for example as described in conjunction with 207 of FIG. 2.

If one or move locality-specific search restriction specifications are determined to be present (903), then a restricted global search is performed with specified search restriction(s) (905). If more than one search restriction specification matches the current or specified location, then one may be selected for use, for example the most specific match with the location. In some embodiments, search restriction specifications may be passed to a server and the server may perform the search, for example as described in conjunction with FIG. 5.

In some embodiments, one or more sponsored search results may optionally be combined with the results of the search (906). Examples of combining sponsored search results are discussed in conjunction with 206 of FIG. 2.

The local search results and optional combined sponsored results may be presented (907). Examples of presenting search results are discussed in conjunction with 207 of FIG. 2.

Figure 10:
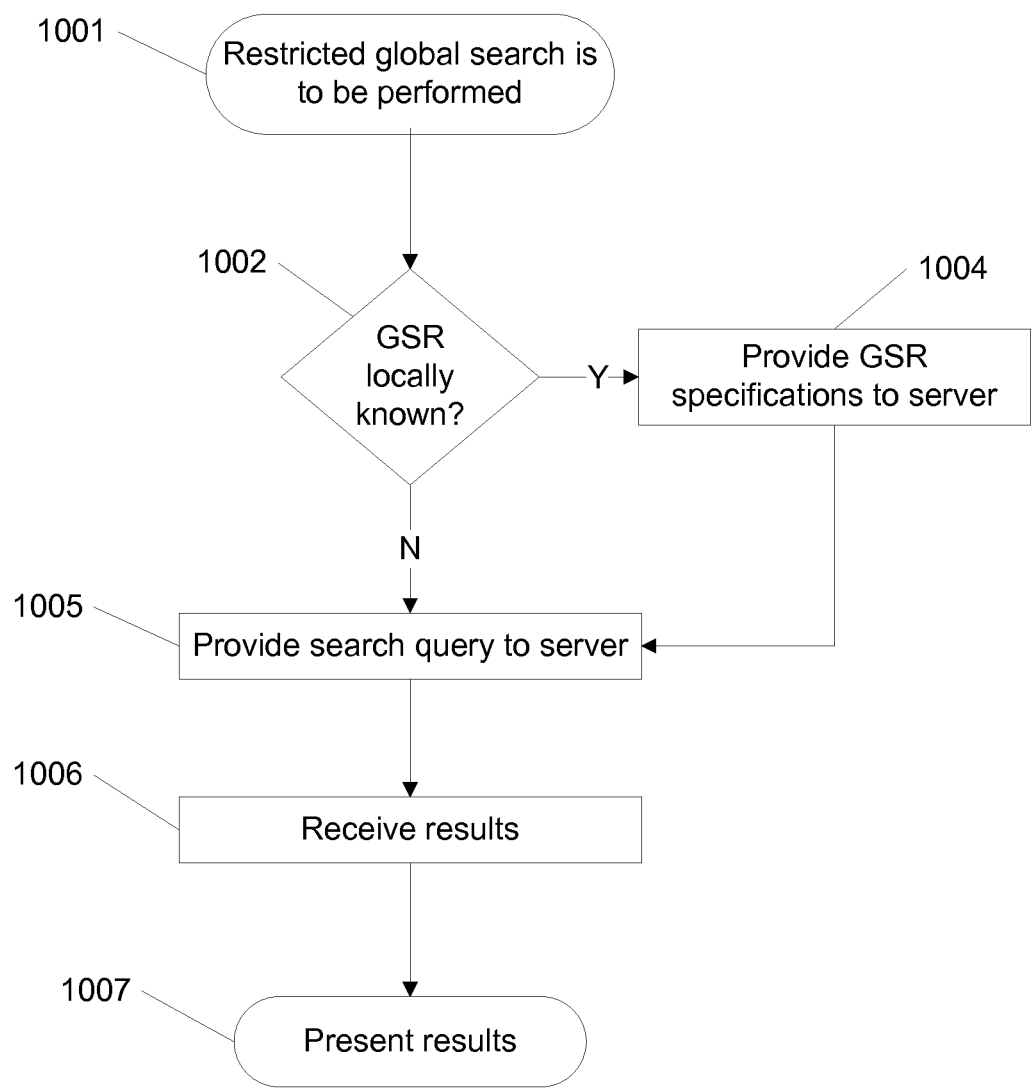
FIG. 10 is a flow diagram of a method for performing a restricted global search in conjunction with a server, according to some embodiments.

FIG. 10 is a flow diagram of a method for performing a restricted global search in conjunction with a server, according to some embodiments. In some embodiments, the technique of FIG. 10 may be performed by a client such as client 101. In this example, a restricted global search is to be performed (1001). It may be determined whether a global search restriction (GSR) is locally known (1002). Examples of determining whether a global search restriction is known include determining whether a global search restriction is specified in a document, in a protocol, or separately, for example as described in conjunction with 302, 303 and 304 respectively of FIG. 3.

If it is determined that a global search restriction is locally known (1002), then in this example a specification of the global search restriction is provided to a server (1004). A specification of a search query may be provided to a server (1005). In some embodiments, specification of the search query may be combined with specification of the global search restriction. A query and optional global search restriction specification may, for example, be provided using a TCP/IP connection over the internet to a server such as search server 104. In some embodiments, a query may include a specification of a location associated with a document being viewed or with a document viewer (for example, a URL that a browser is rendering), or may use the referrer field in an HTTP connection to provide a specification of a location. An example of a query specification is "sitescope:<localURLscope>+<search query>&type=<typelist>," which in this example may specify a restricted global search for <search query> scoped to the directory <localURLscope>, restricted to files contained in the <typelist> field. In this example, a local search from a search toolbar for "search text" at http://www.site.com/directory/page.html may pass "sitescope:www.site.com/directory/+search+text&type=HTML+PDF" back to a search server for processing.

Search results may be received from a server (1006). Examples of search results include display-ready search results such as an HTML document, and structured data such as XML-formatted results. In some embodiments, search results received from a server may include sponsored links, for example as discussed in conjunction with 510 of FIG. 5. Search results may be presented (1007). Examples of presenting search results are discussed in conjunction with 207 of FIG. 2.

Figure 11:
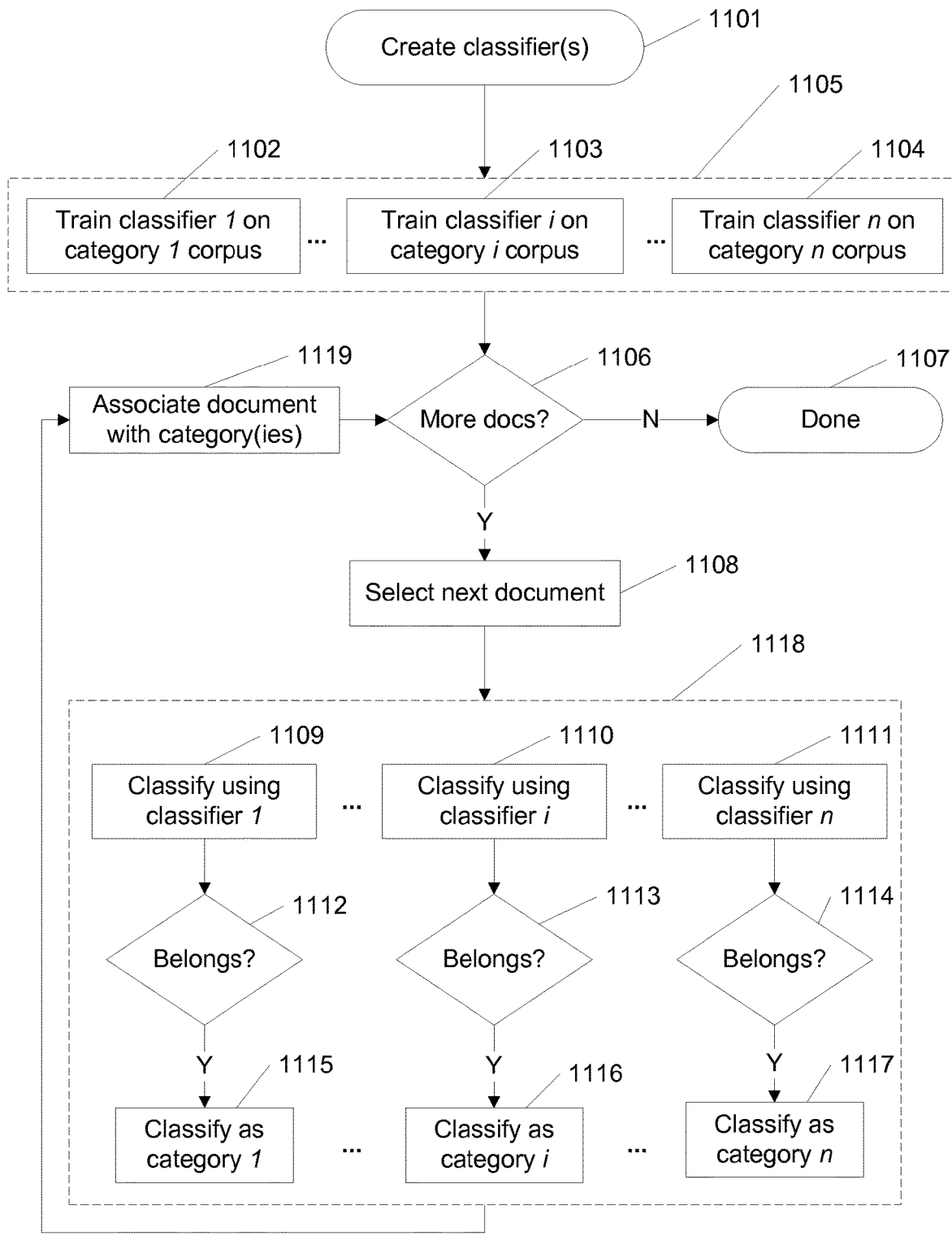
FIG. 11 is a flow diagram of a method for assigning documents to categories, according to some embodiments.

FIG. 11 is a flow diagram of a method for assigning documents to categories, according to some embodiments. In this example, one or more classifiers are created (1101). In some embodiments, multiple classifiers may each be associated with a respective category. In some embodiments, a classifier may be created that may categorize a document with respect to multiple categories. A classifier refers herein to any program, module, routine, or dataset that may determine whether a document belongs to a category, or an extent to which a document belongs to a category. Examples of a classifier include a Bayesian classifier, a genetic classifier, and a support vector machine. An example of creating a classifier is to create an instance of the classifier with an initial classification state. The classifier(s) may be trained (1102, 1103, 1104) on one or more corpora. An example of a corpus is a collection of documents with predetermined classifications for documents within the corpus. In some embodiments, there may be one classification per document in a corpus. In some embodiments, a document in the corpus may be classified to belong to multiple categories. An example of training a classifier on a corpus is to provide the documents in the corpus, with associated predetermined classifications, to the classifier.

After training 1105, it may be determined whether there is a document awaiting classification (1106). In some embodiments, a list of documents may have been created by a document crawler such as a web crawler. If it is determined that there is a document awaiting classification (1106), a next document, for example a first document in a list of documents awaiting classification, is selected in this example (1108).

The document may be classified (1118). A first example of classifying a document is to provide the document to a classifier as an input and receive as output zero or more categories to which the document is determined to belong. A second example of classifying a document is to determine, for each of a plurality of classifiers, whether the document belongs to a category associated with the classifier. An example of determining whether the document belongs to a category associated with a classifier is to run the classifier with the document as input (1109, 1110, 1111). In some embodiments, it may be determined, for a classifier output, whether the document belongs to a category associated with the classifier (1112, 1113, 1114). One example of determining whether a classifier output indicates that a document belongs to a category is to determine whether the output indicates that the document belongs to the category. Another example of determining whether a classifier output indicates that a document belongs to a category is to determine whether an output quantifying an association with the category exceeds a threshold, such as a 50% estimated probability that the document belongs to the category. If it is determined that the association with the category exceeds the threshold (1112, 1113, 1114), then in this example the document is classified as belonging to a category associated with the classifier (1115, 1116, 1117). In some embodiments, a document may be assigned to zero or more categories for which it meets classification criteria. In some embodiments, a document may be assigned to a single category to which it is determined to belong most strongly.

Another example of classifying a document is to manually categorize the document, for example by a document taxonomist. Another example of classifying the document includes taking other factors into account, for example the types and classifications of documents connected to the document being classified. An example of a connection between documents is a hyperlink pointing from one document to another. An example of taking another factor into account is to add an adjustment to a classification metric before comparison to a threshold. In some embodiments, automatic classifications may be overridden. In one example, a taxonomist may reclassify a document. In another example, it may be reported through a user interface element on a client that a document has been misclassified. A report may be sent to a server such as a search server 104, and optionally a reassessment may be made. For example, an identifier associated with a document and classification that has been questioned for being plausibly incorrect may be presented to a taxonomist, who may determine whether to remove and/or change a classification. A review may be triggered when a certain threshold of suspicion has been reached, for example the classification has been indicated as incorrect by a certain number of users. In some embodiments, review may be automatic: for example, if sufficient users have indicated the same "correct" reclassification, a document may be automatically reclassified. When a reclassification has been made, a classifier may be trained on the new classification. Documents may optionally be reclassified when a classifier has been retrained.

Another example of classifying a document is for the document to specify an appropriate or requested classification, for example in a META tag of an HTML document. Such classifications may be detected, for example by a classifier or an indexer such as one associated with a document crawler, and may be adopted or used as guidance into a classification system. In some embodiments, classifications from a trusted site may be adopted or used as guidance into a classifier system, while classifications from an untrusted site may be ignored or weighted less highly.

When the document has been classified (1118), the document may be associated with zero or more categories to which it has been determined to belong (1119). An example of associating a document with a category is to associate an address relating to the document with the category. An example of an address relating to a document is an address, such as a URL, from which the document may be obtained. Another example of associating a document with a category is to add the document to a list of documents that are associated with the category. The process may be continued (1106) until all documents have been classified (1107).

Figure 12:
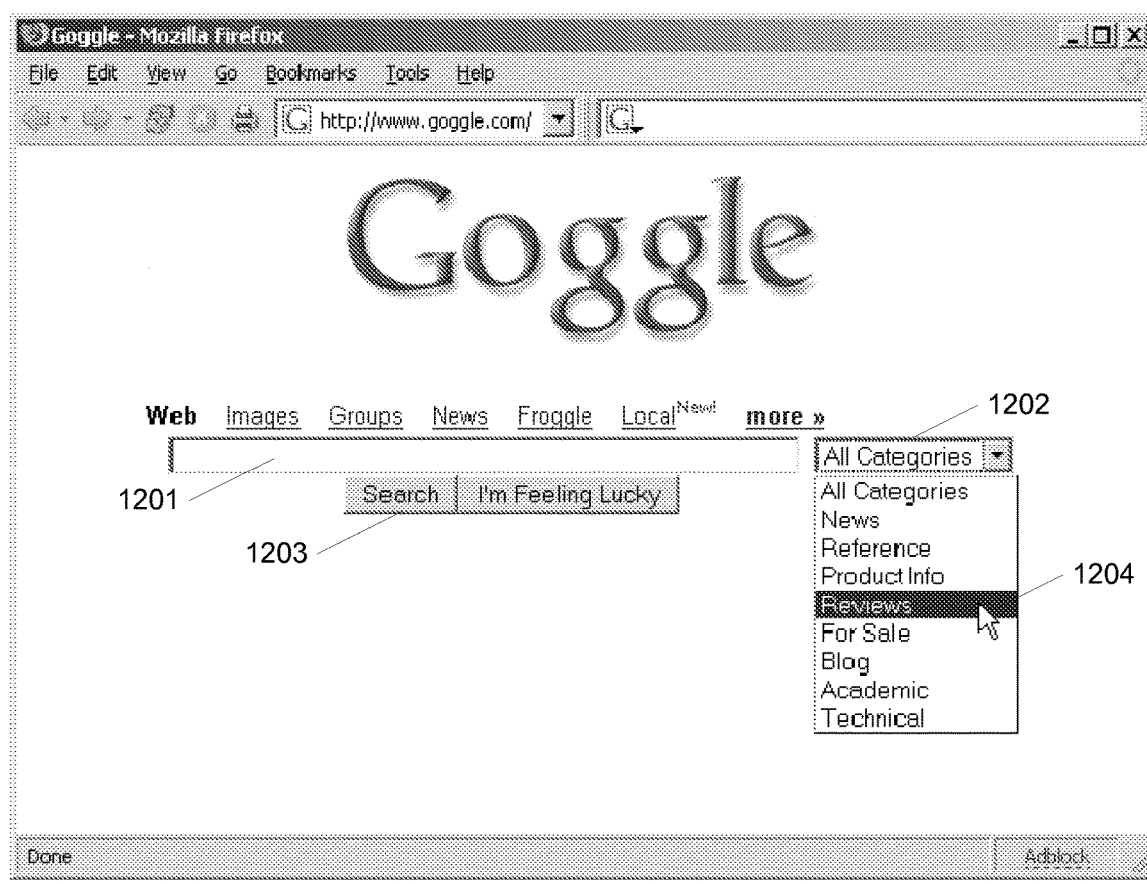
FIG. 12 is an example of a search user interface element with a selectable category, according to some embodiments.

FIG. 12 is an example of a search user interface element with a selectable category, according to some embodiments. In this example, a window provides an input area for search term(s) 1201 and a category selector 1202. A category selector may be any way to select a category from a predetermined list of categories, or a list of categories associated with a current location for a local search or a restricted global search. Examples of a category selector include a pulldown menu, radio buttons and checkboxes. In this example, the category selector is a pulldown menu. A category associated with a search query may be selected. Examples of categories include news, reference, product information, reviews, for sale, blog, academic and technical. In some embodiments, a category may be provided that matches all categories, such as "All Categories." In this example, "Reviews" 1204 is being selected. When the search is submitted, for example via a search button 1203, a search query may be constructed that includes a category and one or more search terms. The search query may be acted upon, for example by sending to a search server such as search server 104 and receiving search results, and search results may be displayed, for example as described in conjunction with 207 of FIG. 2.

Figure 13:
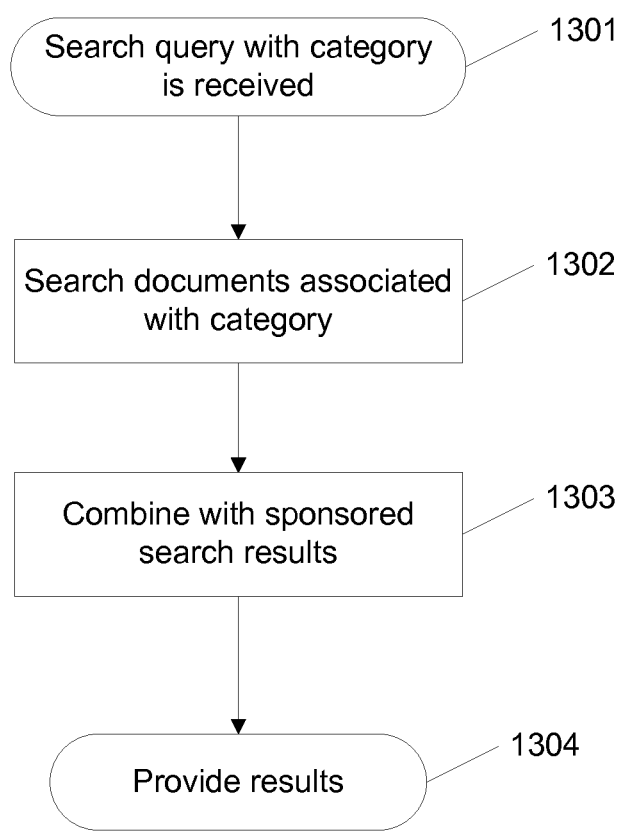
FIG. 13 is a flow diagram of a method for processing a search query including a category specification, according to some embodiments.

FIG. 13 is a flow diagram of a method for processing a search query including a category specification, according to some embodiments. In this example, a search query with an associated desired category is received (1301). Documents associated with the specified category may be searched (1302). An example of searching documents associated with the specified category is to search an inverted index associated with the category for one or more terms associated with the query. In some embodiments, public documents such as documents on the public internet, for example all indexed documents on the public internet, may be searched globally.

In some embodiments, sponsored search results may be combined with search results related to the category (1303). An example of combining sponsored search results into non-sponsored search results is described in conjunction with 206 of FIG. 2. The search results may be provided (1304). An example of providing search results is to send the results to the entity that provided the search query, for example as discussed in conjunction with 511 of FIG. 5.

Figure 14:
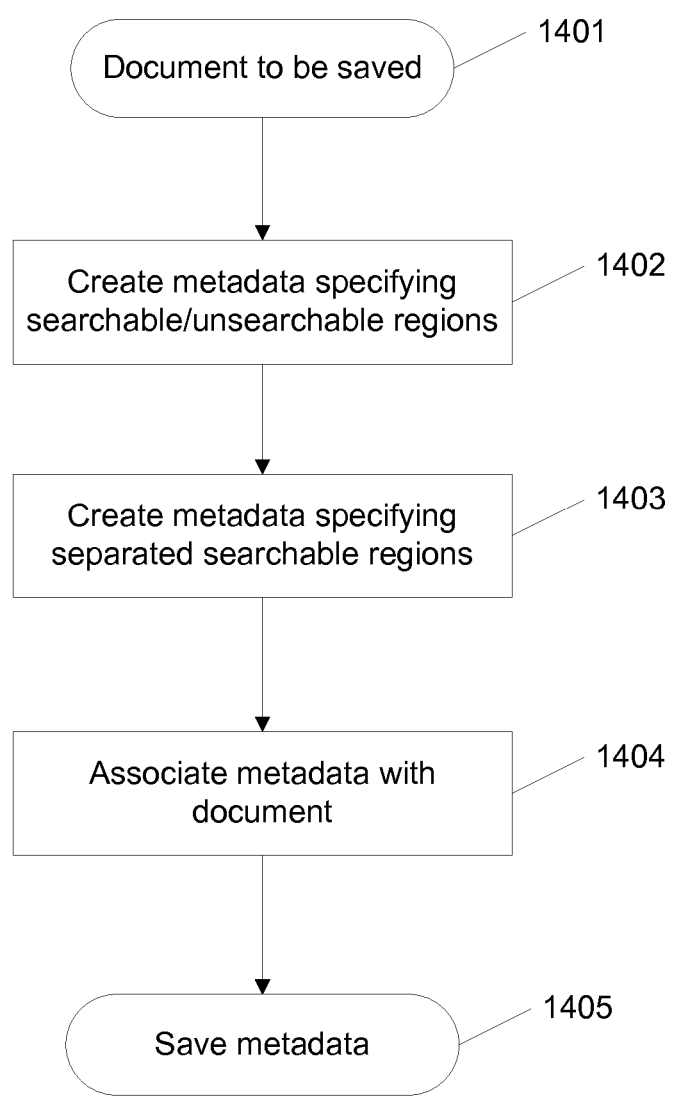
FIG. 14 is a flow diagram of a method for creating search metadata, according to some embodiments.

FIG. 14 is a flow diagram of a method for creating search metadata, according to some embodiments. Search metadata refers herein to information relating to a document that facilitates searching. Examples of search metadata include information about searchable regions of a document, information about unsearchable regions of a document, and information about separated searchable regions of a document. In this example, a document is to be saved (1401). An example of a reason a document is to be saved is that a software program is saving a document, for example because of a user election to save the document and/or exit the application, or because a predetermined period of time and/or activity has elapsed. Examples of applications include word processors, image editors, web page creators, music or video file editors or rippers, spreadsheets, presentation editors, databases, and any other application that may create a document.

Metadata may be created specifying searchable and/or unsearchable regions (1402). In some embodiments, metadata creation may be initiated by an application saving the document. In some embodiments, metadata creation may be separate from the application. For example, metadata creation may be triggered by writing the document. An example of writing triggering metadata creation is for an operating system related component such as a filesystem component to detect a write operation associated with a file and create or update metadata associated with the file. In some embodiments, a metadata creating component may be associated with a document of a particular type, for example via an association with a filename extension in a data repository such as a Windows registry. An example of a searchable region is a region containing content that may reasonably be searched, such as a cell in a spreadsheet, a text region in a word processing document, closed captioning information in a video stream, and album, artist and track information in a music file. An example of an unsearchable region is a region containing content that may not reasonably be searched, such as information relating to formatting in a spreadsheet or word processor, and video or audio data. Metadata may specify searchable and/or unsearchable regions. One example of specifying a region is to specify a byte range for a region relating to byte positions of the beginning and/or end of a region within a document such as a file. In another example of specifying a region, an electronic document produced by an application such as a word processor may have fields of searchable data such as text delimited by region tags, for example a string of pseudo-random bytes that do not occur anywhere else in the document, which may be predetermined, or may be defined at a standard location in a header. In some embodiments, such delimiters may be placed around a searchable region such as a field of text, omitting formatting directives and other unsearchable data.

In some embodiments, metadata may be created specifying separated searchable regions (1403). Separated searchable regions refer herein to regions that may be searched separately from each other. For example, if a search query contains two terms, A and B, and a document to be searched has two separated searchable regions, R1 and R2, wherein R1 contains A but not B and R2 contains B but not A, the search query in this example will not find a match in the document, because no searchable region contains all the search terms. In some embodiments, separated searchable regions may be automatically generated. For example, separate tables in a database or cells in a spreadsheet may be associated with different separated searchable regions. In some embodiments, a separated searchable region may be associated with one or more distinct identifiers, such as sequentially generated numbers. In some embodiments, more than one physical region of a document may belong to the same separated searchable region, for example if they are associated with a common identifier.

In some embodiments, separated searchable regions may be explicitly specified. For example, the beginning and/or end of a separated searchable region in an HTML document may be specified with an argument to an existing tag, for example <DIV REGION>, or with a new tag, for example <REGION>. An identifier associated with the separated searchable region may optionally be provided, for example <DIV REGION="participants"> or <REGION name="participants">. The end of a region may be specified, for example with a </DIV> or </REGION>. In some embodiments, a part of a document may belong to multiple separated searchable regions. In one example, this may be specified by being in multiple non-terminated separated searchable region specifications in the same area of the document. In another example, multiple separated searchable regions may be specified explicitly, for example <DIV REGION="participants,homeowners"> or <REGION NAME="participants,homeowners"> to indicate the beginning of a separated searchable region associated with both the "participants" and "homeowners" identifiers.

Search metadata may be associated with the document (1404). In some embodiments, search metadata may be included in the document. In some embodiments, search metadata may be stored separately from the document and associated with the document. An example of separate storage of search metadata is to place a file with a standard name in the same directory as a file about which it provides search information. For example, a metadata file associated with the file "file.ext" could be named "file.ext.mdt." Another example of separate storage of search metadata is to maintain a shadow filesystem containing only metadata. Yet another example is to store search metadata in an object such as a file with the same name as a file containing data referred to, with an indication such as a flag indicating that the object contains metadata. Such an object may, for example, be a file kept invisible to a user by an operating system or application.

Metadata may be saved (1405). One example of saving metadata is to write a document including the metadata. Another example of saving metadata is to write a shadow file or metadata file associated with the document.

Figure 15:
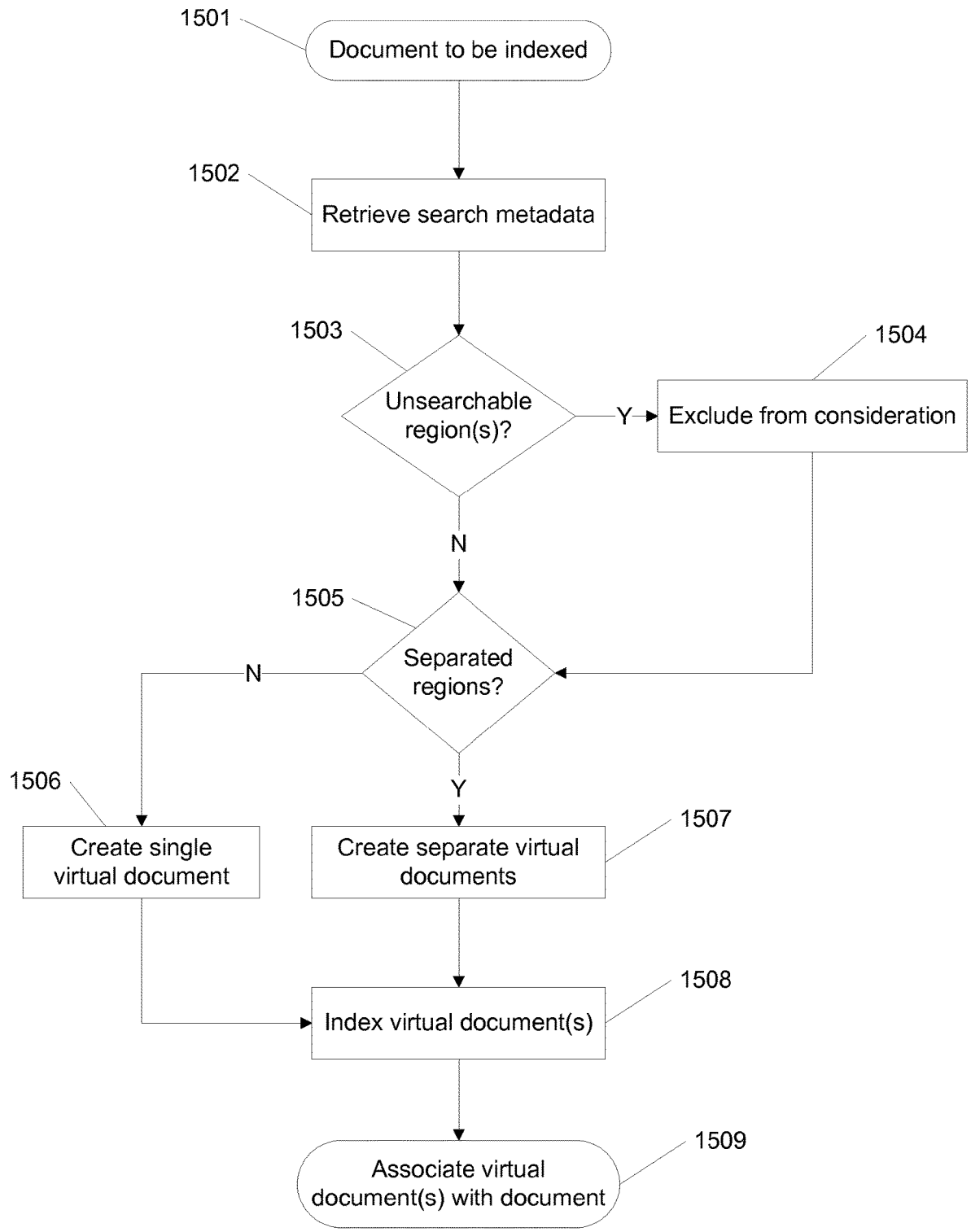
FIG. 15 is a flow diagram of a method for indexing a document with associated search metadata, according to some embodiments.

FIG. 15 is a flow diagram of a method for indexing a document with associated search metadata, according to some embodiments. In this example, a document is to be indexed (1501). For example, a document retrieved by a crawler such as a web crawler may be ready for processing by an indexer. Indexing refers herein to any generation of metadata relating to a document that facilitates searching for search terms, such as generating an index of words or stems appearing in a document. Examples of indexers include Lucene, available as open-source software from the Apache Jakarta Project, and Egothor, available as open-source software from Egothor.org.

Search-related metadata may be retrieved (1502). One example of retrieving search-related metadata is to extract search-related metadata from the document. Another example of retrieving search-related metadata is to obtain separate search-related metadata associated with the document, for example by obtaining a file with a name associated with the name of the document. Examples of search metadata, and of associations between a document and search metadata, are discussed in conjunction with FIG. 14.

It may be determined whether there is an unsearchable region in the document (1503). Examples of unsearchable regions are discussed in conjunction with 1402 of FIG. 14. An example of determining that there is an unsearchable region in a document is to detect an unsearchable region in metadata, for example a specification of an unsearchable region, or a specification of one or more searchable regions that excludes an implicitly unsearchable region. If it is determined that there is an unsearchable region (1503), then in this example one or more unsearchable regions may be excluded from consideration (1504). One example of excluding a region from consideration is to remove the region from an instance of the document, for example by reformatting the document or by creating a virtual document as described in conjunction with 1507, wherein the virtual document includes searchable region(s) and not unsearchable region(s). Another example of excluding a region from consideration is to mark the region, either intrinsically or via metadata, so it may not be processed as described in conjunction with 1508.

It may be determined whether there are separated searchable regions in the document (1505). Examples of separated searchable regions are discussed in conjunction with 1403 of FIG. 14. If it is determined that there are no separated searchable regions in the document (1505), then in this example a single virtual document is created (1506). An example of creating a single virtual document is to consider the document to be a virtual document.

If it is determined that there are separated searchable regions in the document (1505), then separate virtual documents are created in this example (1507). A virtual document refers herein to an object that may be processed separately, for example as described in conjunction with 1508. Examples of a virtual document include a separately generated document and metadata information relating to one or more separated searchable regions associated with the virtual document. In some embodiments, a virtual document may be created for each separated searchable region in the document. In some embodiments, a virtual document may be created for each unique identifier associated with a separated searchable region in the document, for example including every separated searchable region in the document associated with the identifier.

The virtual document(s) may be indexed (1508). An example of indexing a virtual document is to create index entries associating potential search terms such as words or stems with the virtual document.

The virtual document(s) may be associated with the document (1509). An example of associating the virtual document(s) with the document is to store information relating the virtual document to the document, for example in one or more indices or in a separate mapping table such as a database or a flat file containing mappings of virtual documents to documents. In some embodiments, the document and/or associated index or indices may be associated with one or more categories, for example as described in conjunction with FIG. 11.

Figure 16:
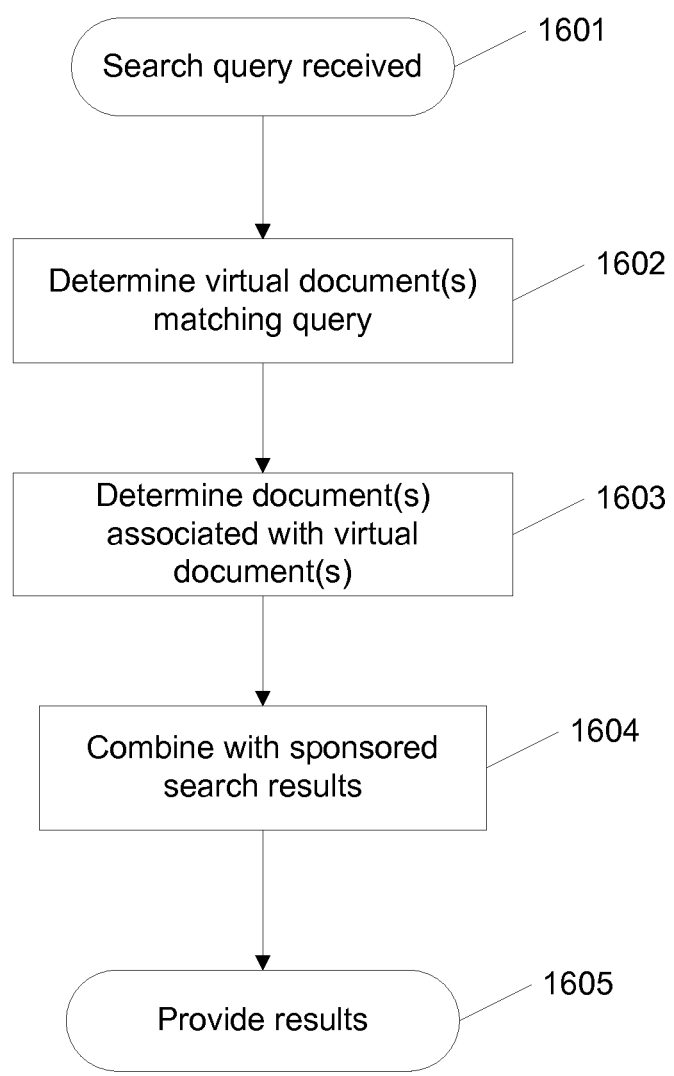
FIG. 16 is a flow diagram of a method for searching documents with separated searchable regions, according to some embodiments.

FIG. 16 is a flow diagram of a method for searching documents with separated searchable regions, according to some embodiments. In this example, a search query is received (1601). A search query may, for example, be associated with one or more search terms, and may be received by a server such as search server 104. In some embodiments, a search query may contain information relating to a local search, such as a specification of a local search mechanism. In some embodiments, a search query may contain information relating to a restricted global search such as a specification of a scope and/or document type(s). One or more indices may be searched for the search term(s) and one or more virtual documents associated with the search term(s) may be obtained (1602). In some embodiments, virtual documents may have been associated with the search term(s) as described in conjunction with 1508 of FIG. 15.

One or more documents associated with the virtual document(s) may be determined (1603). Examples of determining a document associated with a virtual document include querying a database using information associated with the virtual document as a key, and determining an association between the virtual document and the document in a flat file. In some embodiments, documents may have been associated with virtual documents as described in conjunction with 1509 of FIG. 15.

Sponsored search results may optionally be combined with information relating to the document(s) (1604). Examples of combining sponsored search results with unsponsored search results are discussed in conjunction with 206 of FIG. 2. Results may be provided (1605). Examples of providing results are discussed in conjunction with 511 of FIG. 5.

Figure 17:
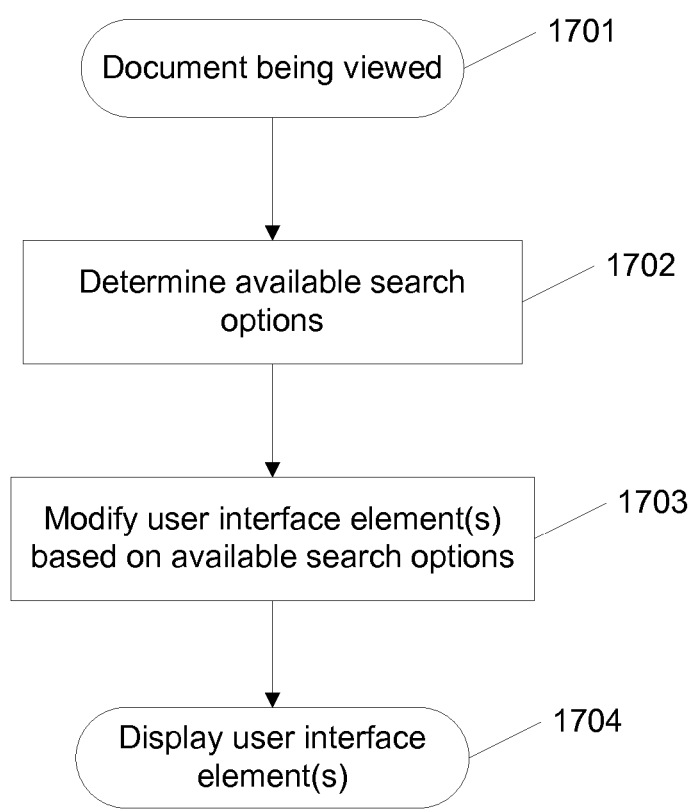
FIG. 17 is a flow diagram of a method for customizing a search user interface, according to some embodiments.

FIG. 17 is a flow diagram of a method for customizing a search user interface, according to some embodiments. In this example, a document is being viewed (1701). An example of a document being viewed is a web browser displaying a web page. Available search options may be determined (1702). An example of determining available search options is to determine search mechanisms such as local search mechanism(s) or global restrictions, for example as described in conjunction with FIG. 3. Another example of determining available search options is to determine a category or categories of documents are available for local searching. Such available category information for locally scoped searches may, for example, be provided as a search mechanism, for example as described in conjunction with FIG. 3. In some embodiments, specifications related to user interface element(s), such as custom options specific to a location being visited, may be provided as parameters associated with a search mechanism specification, for example as name/value pairs or XML-formatted data.

One or more user interface elements may be modified based on available search options (1703). Examples of user interface elements include a search bar, a context-sensitive menu, help text and mouseover text. An example of modifying an element is to omit the element or render the element non-selectable if it is associated with an option that is not present, such as local search. Another example of modifying an element is to create a list of available categories for a local search. Another example of modifying an element is to insert help text or mouseover text associated with the element. Another example of modifying an element is to display a custom element specific to a location being visited.

User interface element(s) associated with searching may be displayed (1704). In some embodiments, when a custom option is selected, information associated with the custom option selection may be included in a search query.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for searching, comprising:
    crawling, by a crawler executed on a search server, an enumeration of one or more searchable local documents, wherein the enumeration of one or more searchable local documents includes a tag specifying a location of a searchable local document that is indexable by the crawler;
    retrieving, by the crawler, the searchable local document according to the specified location;
    assigning, by the search server, the searchable local document as belonging to a plurality of categories using a plurality of classifiers executed on the search server, wherein each of the plurality of classifiers is associated with a respective category;
    providing, via a client device connected to the search server via a network, a user interface, wherein the user interface comprises an input area and a category selector;
    receiving, via the client device, a search term via the input area of the user interface and a selection of a first category of the plurality of categories via the category selector;
    determining, by the search server, a plurality of documents associated with the search term and the first category; and
    providing, by the search server, the determined plurality of documents as a search result to the client device.

2. The method of claim 1, wherein the crawling is a crawling of the Internet.

3. The method of claim 1, further comprising:
    combining the search result with sponsored results.

4. The method of claim 1, wherein the plurality of classifiers comprise a Bayesian classifier or a support vector machine.

5. The method of claim 1, further comprising:
    training the plurality of classifiers using a training corpus, wherein the training corpus includes a plurality of training documents, wherein each of the plurality of training documents is associated with at least one category.

6. The method of claim 1, wherein the category selector includes a pulldown menu.

7. The method of claim 1, wherein the category selector includes checkboxes.

8. The method of claim 1, wherein determining the plurality of documents includes searching an inverted index associated with the first category.

9. A system for searching, comprising:
    a search server; and
    a client device connected to the search server via a network;
    wherein the search server is configured to execute a crawler to:
        crawl an enumeration of one or more searchable local documents, wherein the enumeration of one or more searchable local documents includes a tag specifying a location of a searchable local document that is indexable by the crawler; and
        retrieve the searchable local document according to the specified location;
    wherein the search server is further configured to execute a plurality of classifiers to assign the searchable local document as belonging to a plurality of categories, wherein each of the plurality of classifiers is associated with a respective category;
wherein the client device is configured to:
provide a user interface, wherein the user interface comprises an input area and a category selector; and
receive a search term via the input area of the user interface and a selection of a first category of the plurality of categories via the category selector;
wherein the search server is further configured to:
determine a plurality of documents associated with the search term and the first category; and
provide the determined plurality of documents as a search result to the client device.

10. The system of claim 9, wherein the processor is further configured to train the plurality of classifiers using a training corpus, wherein the training corpus includes a plurality of training documents, wherein each of the plurality of training documents is associated with at least one category.

11. The system of claim 9, wherein the category selector includes a pulldown menu.

12. One or more non-transitory computer-readable mediums having processor-executable instructions stored thereon for searching, wherein the processor-executable instructions, when executed, facilitate:
crawling, by a crawler executed on a search server, an enumeration of one or more searchable local documents, wherein the enumeration of one or more searchable local documents includes a tag specifying a location of a searchable local document that is indexable by the crawler;
retrieving, by the crawler, the searchable local document according to the specified location;
assigning, by the search server, the searchable local document as belonging to a plurality of categories using a plurality of classifiers executed on the search server, wherein each of the plurality of classifiers is associated with a respective category;
providing, via a client device connected to the search server via a network, a user interface, wherein the user interface comprises an input area and a category selector;
receiving, via the client device, a search term via the input area of the user interface and a selection of a first category of the plurality of categories via the category selector;
determining, by the search server, a plurality of documents associated with the search term and the first category; and
providing, by the search server, the determined plurality of documents as a search result to the client device.

13. The one or more non-transitory computer-readable mediums of claim 12, wherein the processor-executable instructions, when executed, further facilitate:
training the plurality of classifiers using a training corpus, wherein the training corpus includes a plurality of training documents, wherein each of the plurality of training documents is associated with at least one category.

14. The one or more non-transitory computer-readable mediums of claim 12, wherein the category selector includes a pulldown menu.

* * * * *